US012795549B2

(12) United States Patent
Choi et al.

(10) Patent No.: US 12,795,549 B2
(45) Date of Patent: Nov. 10, 2026

(54) ELECTRONIC DEVICE AND METHOD FOR ADAPTIVELY ENABLING TRIGGER-ENABLED TARGET WAKE TIME COMMUNICATION BASED ON RADIO RESOURCE CONTENTION DETECTION

(71) Applicant: SAMSUNG ELECTRONICS CO., LTD., Suwon-si (KR)

(72) Inventors: Junsu Choi, Suwon-si (KR); Jeongyong Myoung, Suwon-si (KR); Hyunkee Min, Suwon-si (KR); Junyoung Park, Suwon-si (KR); Changmok Yang, Suwon-si (KR); Sunkey Lee, Suwon-si (KR); Junghun Lee, Suwon-si (KR); Hyeonu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 685 days.

(21) Appl. No.: 18/137,245

(22) Filed: Apr. 20, 2023

(65) Prior Publication Data

US 2023/0262604 A1 Aug. 17, 2023

Related U.S. Application Data

(63) Continuation of application No. PCT/KR2021/013563, filed on Oct. 5, 2021.

(30) Foreign Application Priority Data

Nov. 16, 2020 (KR) ........................ 10-2020-0152789

(51) Int. Cl.

| | |
|---|---|
| ***H04W 52/02*** | (2009.01) |
| ***H04W 48/10*** | (2009.01) |
| *H04W 84/12* | (2009.01) |

(52) U.S. Cl.
CPC ....... *H04W 52/0248* (2013.01); *H04W 48/10* (2013.01); *H04W 52/0235* (2013.01); *H04W 84/12* (2013.01)

(58) Field of Classification Search
CPC ......... H04W 52/0248; H04W 52/0235; H04W 52/02; H04W 52/0216; H04W 52/0219;
(Continued)

(56) References Cited

U.S. PATENT DOCUMENTS

| | | | |
|---|---|---|---|
| 9,713,087 | B2 | 7/2017 | Asterjadhi et al. |
| 10,057,856 | B2 | 8/2018 | Wei et al. |

(Continued)

FOREIGN PATENT DOCUMENTS

| | | | |
|---|---|---|---|
| KR | 10-2015-0105337 | A | 9/2015 |
| KR | 10-2019-0105665 | A | 9/2019 |
| KR | 10-2020-0128373 | A | 11/2020 |

OTHER PUBLICATIONS

International Search Report (PCT/ISA/210) issued by the International Searching Authority on Jan. 28, 2022 for International Application No. PCT/KR2021/013563.

(Continued)

*Primary Examiner* — Ricardo H Castaneyra
(74) *Attorney, Agent, or Firm* — Sughrue Mion, PLLC

(57) ABSTRACT

An electronic device includes: a wireless communication circuit; a memory storing at least one instruction; and a processor configured to execute the at least one instruction to: broadcast, using the wireless communication circuit and based on a time interval, a first signal including first data that may include time information; detect, during a time span corresponding to the time information, at least one second external electronic device from among the plurality of external electronic devices that uses a radio resource for communication with at least one of the electronic device and (Continued)

the first external electronic device, wherein the time span occurs after the broadcasting of the first signal; determine a number of detections made by the detecting of the at least one second external electronic device, during the time span; and based on the number of detections exceeding a threshold value, perform, using the wireless communication circuit, communication with the first external electronic device based on a trigger frame signal received from the first external electronic device.

13 Claims, 14 Drawing Sheets

(58) Field of Classification Search
CPC ......... H04W 52/0229; H04W 52/0225; H04W 52/0258; H04W 48/10; H04W 84/12; H04W 4/06; H04W 4/80; H04W 72/04; H04W 72/0446; Y02D 30/70
USPC .................................................. 370/311, 318
See application file for complete search history.

(56) References Cited

U.S. PATENT DOCUMENTS 10,194,391 B2 1/2019 Asterjadhi et al.
10,484,309 B2 11/2019 Li et al.
10,499,333 B2 12/2019 Asterjadhi et al.
10,560,965 B2 2/2020 Son et al.
10,624,135 B2 4/2020 Kwon et al.
10,716,066 B2 7/2020 Huang et al.
10,827,425 B2 11/2020 Asterjadhi et al.
10,904,829 B2 1/2021 Kneckt et al.
10,952,139 B2 3/2021 Asterjadhi et al.
11,172,518 B2 11/2021 Kwon et al.
11,197,242 B2 12/2021 Monajemi et al.
11,490,331 B2 11/2022 Cariou et al.
2015/0341961 A1 11/2015 Kim et al.
2016/0044598 A1 2/2016 Wei et al.
2016/0073433 A1 3/2016 Kwon et al.
2016/0143058 A1 5/2016 Son et al.
2016/0219522 A1 7/2016 Asterjadhi et al.
2017/0202024 A1 7/2017 Son et al.
2017/0280388 A1 9/2017 Asterjadhi et al.
2017/0347372 A1 11/2017 Li et al.
2018/0014252 A1 1/2018 Wei et al.
2018/0092132 A1 3/2018 Kwon et al.
2018/0115997 A1 4/2018 Son et al.
2018/0332534 A1 11/2018 Hou et al.
2019/0021055 A1 1/2019 Guo et al.
2019/0045438 A1 2/2019 Cariou et al.
2019/0053155 A1 2/2019 Kneckt et al.
2019/0246354 A1 8/2019 Huang et al.
2019/0253968 A1 8/2019 Xiao et al.
2019/0306790 A1 10/2019 Kottontavida et al.
2020/0015165 A1* 1/2020 Hwang ............. H04W 52/0229
2020/0084102 A1 3/2020 Choi et al.
2020/0229086 A1 7/2020 Monajemi et al.
2021/0007168 A1* 1/2021 Asterjadhi ........ H04W 52/0235
2022/0070773 A1 3/2022 Monajemi et al.
2022/0078079 A1 3/2022 Choi et al.

OTHER PUBLICATIONS

Written Opinion (PCT/ISA/237) issued by the International Searching Authority on Jan. 28, 2022 for International Application No. PCT/KR2021/013563.
Communication dated Mar. 9, 2026, issued by the Korean Ministry of Intellectual Property in Korean Application No. 10-2020-0152789.

* cited by examiner

ELECTRONIC DEVICE AND METHOD FOR ADAPTIVELY ENABLING TRIGGER-ENABLED TARGET WAKE TIME COMMUNICATION BASED ON RADIO RESOURCE CONTENTION DETECTION

CROSS-REFERENCE TO RELATED APPLICATIONS

This application is a continuation application of International Application No. PCT/KR2021/013563, filed on Oct. 5, 2021, which claims priority to Korean Patent Application 10-2020-0152789, filed on Nov. 16, 2020, in the Korean Intellectual Property Office, the disclosures of which are incorporated by reference herein in their entireties.

BACKGROUND

1. Field

The disclosure relates to a method for performing wireless communication and an electronic device supporting the same.

2. Description of Related Art

With the development of information communication technology, various wireless communication technologies are being developed. Among them, a wireless local area network (WLAN) may refer to a technology for wirelessly accessing the Internet at home, a business, and/or a specific service providing area by using various types of electronic devices that may implement radio frequency technology.

One of the telecommunication standards for a WLAN technology that is being developed is the Institute of Electrical and Electronics Engineers (IEEE) 802.11 standard. As such WLANs are increasingly spreading and applications using the WLANs are diversified, a need for a new WLAN technology that supports a higher throughput than the existing WLAN technology has emerged. For example, to support a data processing speed of 1 Gbps or more, a very high throughput (VHT) WLAN technology is being proposed. Among the proposed technologies, a WLAN technology according to a IEEE 802.11ax standard aims to improve frequency efficiency in a dense environment. In IEEE 802.11ax, a target wake time (TWT) technology has been introduced to enable a plurality of electronic devices to be activated in a specified interval. Based on TWT negotiation, electronic devices may perform communication by using the announced TWT and trigger-enabled operation.

Since communication nodes (e.g., access point (AP) or station (STA)) that support a WLAN technology may operate in a limited battery environment, communication nodes may require a technology capable of reducing power consumption in the process of performing their operation using a WLAN technology.

An electronic device according to the related art may prevent power consumption of an external electronic device due to unnecessary data access by using a target wake time (TWT) technology. However, the related art electronic device requires an additional operation in the process of performing a communication operation using the announced TWT and/or trigger-enabled option within a TWT service period (SP), and as a consequence, it is likely that the processing time for data transmission is delayed (e.g., extended).

For example, while performing a communication operation based on an announced TWT operation and/or a trigger-enabled option, a related art electronic device may require additional processing time for transmitting and/or receiving specified data (e.g., PS-poll and/or data frame). In addition, the processing time may be delayed relatively long due to collisions (e.g. resource collisions) that may occur as a plurality of electronic devices attempt to use the same radio resources at the same time to perform communication.

SUMMARY

According to an aspect of the disclosure, an electronic device includes: a wireless communication circuit configured to perform Wi-Fi communication with a first external electronic device of a plurality of external electronic devices; a memory storing at least one instruction; and a processor operatively coupled to the wireless communication circuit and the memory, the processor being configured to execute the at least one instruction to: broadcast, using the wireless communication circuit and based on a time interval, a first signal including first data that may include time information; detect, during a time span corresponding to the time information, at least one second external electronic device from among the plurality of external electronic devices that uses a radio resource for communication with at least one of the electronic device and the first external electronic device, wherein the time span occurs after the broadcasting of the first signal; determine a number of detections made by the detecting of the at least one second external electronic device, during the time span; and based on the number of detections exceeding a threshold value, perform, using the wireless communication circuit, communication with the first external electronic device based on a trigger frame signal received from the first external electronic device.

The processor may be further configured to execute the at least one instruction to broadcast the first signal including the first data, after setting values corresponding to a rate subfield and a length subfield in the first data to specified values.

The processor may be further configured to execute the at least one instruction to: determine a delay time for delaying use of the radio resource for communication used by the at least one second external electronic device, based on the predetermined value corresponding to the rate subfield and the another predetermined value corresponding to length subfield; and determine, based on the delay time, whether the at least one second external electronic device is using the radio resource for communication with the at least one of the electronic device and the first external electronic device.

The processor may be further configured to execute the at least one instruction to, based the trigger frame signal being received from the first external electronic device, transmit, to the first external electronic device, a second signal including second data.

The second data may include at least one of a power saving (PS)-poll frame, an unscheduled-automatic power saver delivery (U-APSD) frame, and a null frame.

The memory further stores target wake time (TWT) setting information associated with the performing of the communication with the first external electronic device, and the TWT setting information may include at least one of a TWT identifier (ID), a service type allocated to the TWT, a service period of the TWT, and a TWT interval.

The processor may be further configured to execute the at least one instruction to: perform a TWT negotiation with the first external electronic device, wherein a flow type field value of the TWT setting information is changed from a first flow type to a second flow type; and perform the communication with the first external electronic device using the second flow type.

According to an aspect of the disclosure, an electronic device includes: a wireless communication circuit configured to perform Wi-Fi communication or Bluetooth communication with an external electronic device; a memory storing at least one instruction; and a processor operatively coupled to the wireless communication circuit, the processor being configured to execute the at least one instruction to: determine whether a radio resource for performing communication with the external electronic device is in use by Wi-Fi communication or Bluetooth communication performed by at least one of a plurality of electronic devices; based on determining that the radio resource is in use, transmit, to the external electronic device using the wireless communication circuit, a first signal indicating a wake-up state of the electronic device and then perform communication, using the wireless communication circuit, with the external electronic device; and based on determining that the radio resource is not in use, perform communication, using the wireless communication circuit, with the external electronic device without transmission of the first signal.

The wireless communication circuit may be further configured to: transmit, to the external electronic device, a radio signal associated with a first service and a second service; and receive, from the external electronic device, another radio signal associated with the first service and the second service, and the processor may be further configured to execute the at least one instruction to: set a target wake time (TWT) interval to a first interval when a TWT negotiation is performed with the external electronic device; based on the first interval elapsing, transition from a sleep state to the wake-up state when the first service is executed to communicate with the external electronic device; and transmit, to the external electronic device, the first signal including first data after transitioning to the wake-up state.

The processor may be further configured to execute the at least one instruction to: based on a second interval elapsing, transition from the sleep state to the wake-up state when the second service is executed to communicate with the external electronic device, transmit, to the external electronic device, a second signal including second data after transitioning to the wake-up state, and the second interval is longer than the first interval.

The first interval may correspond to an interval of first traffic generated while the first service is being executed, and the second interval may correspond to an interval of second traffic generated while the second service is being executed.

The first data may include at least one of a power saving (PS)-poll frame, an unscheduled-automatic power saver delivery (U-APSD) frame, and a null frame.

The memory may further store target wake time (TWT) setting information associated with the performing of the communication with the external electronic device, and the TWT setting information may include at least one of a TWT identifier (ID), a service type allocated to the TWT, a service period of the TWT, and a TWT interval.

The processor may be further configured to execute the at least one instruction to: perform a TWT negotiation with the external electronic device, wherein a trigger subfield value of the TWT setting information is changed from a first trigger value to a second trigger type based on the determination of whether the radio resource is in use; and perform the communication with the external electronic device using the second trigger type.

According to an aspect of the disclosure, a method for performing wireless communication by an electronic device, includes: broadcasting, based on a time interval, a first signal including first data that may include time information; detecting, during a time span corresponding to the time information, at least one second external electronic device from among a plurality of external electronic devices that uses a radio resource for communication with at least one of the electronic device and a first external electronic device of the plurality of external electronic devices, wherein the time span occurs after the broadcasting of the first signal; determining a number of detections made by the detecting of the at least one second external electronic device, during the time span; and based on determining that the number of detections exceeds a threshold value, performing communication with the first external electronic device based on a trigger frame signal received from the first external electronic device.

The broadcasting of the first signal may include: broadcasting the first signal including the first data, after setting values corresponding to a rate subfield and a length subfield in the first data to specified values.

The method may further include: determining a delay time for delaying use of the radio resource for communication used by the at least one second external electronic device, based on the predetermined value corresponding to the rate subfield and the another predetermined value corresponding to length subfield; and determining, based on the delay time, whether the at least one second external electronic device is using the radio resource for communication with the at least one of the electronic device and the first external electronic device.

The method may further include, based on the trigger frame signal being received from the first external electronic device, transmitting, to the first external electronic device, a second signal including second data.

The method may further include performing a target wake time (TWT) negotiation with the first external electronic device, wherein at least one of a flow type field value and a trigger subfield value of the TWT setting information is changed from a first value to a second value.

The method may further include: setting a target wake time (TWT) interval to a first interval based on the performing of the TWT negotiation with the first external electronic device; based on the first interval elapsing, transitioning from a sleep state to a wake-up state when a first service is executed to communicate with the first external electronic device; and transmitting, to the first external electronic device, the first signal including the first data, after the transitioning to the wake-up state.

According to one or more embodiments of the disclosure, in performing a TWT operation, an electronic device may selectively use a trigger-enabled option based on a communication state of external electronic devices, thereby reducing power consumption and operating time required to perform a communication function.

According to one or more embodiments of the disclosure, in performing communication, an electronic device may selectively use an announced TWT based on a use (and/or occupancy) state of radio resources used and/or the type of service executed in the electronic device, thereby transmitting and/or receiving data more efficiently.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

Reference throughout the present disclosure to “one embodiment,” “an embodiment,” “an example embodiment,” or similar language may indicate that a particular feature, structure, or characteristic described in connection with the indicated embodiment is included in at least one embodiment of the present solution. Thus, the phrases “in one embodiment”, “in an embodiment,” “in an example embodiment,” and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, various embodiments disclosed in the disclosure will be described with reference to the accompanying drawings. However, this is not intended to limit the disclosure to the specific embodiments, and it is to be construed to include various modifications, equivalents, and/or alternatives of embodiments of the disclosure.

Figure 1:
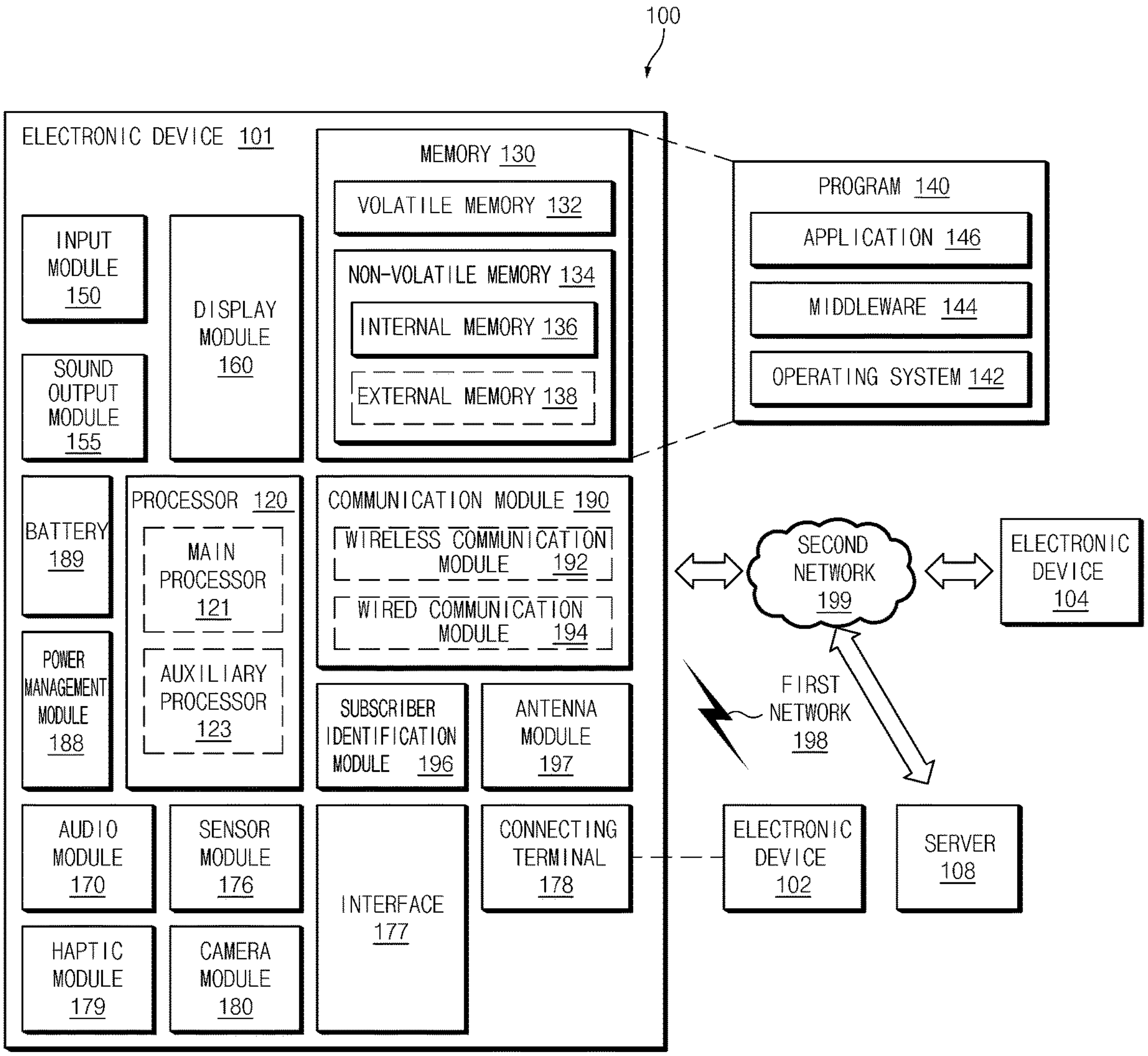
FIG. 1 is a block diagram illustrating an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
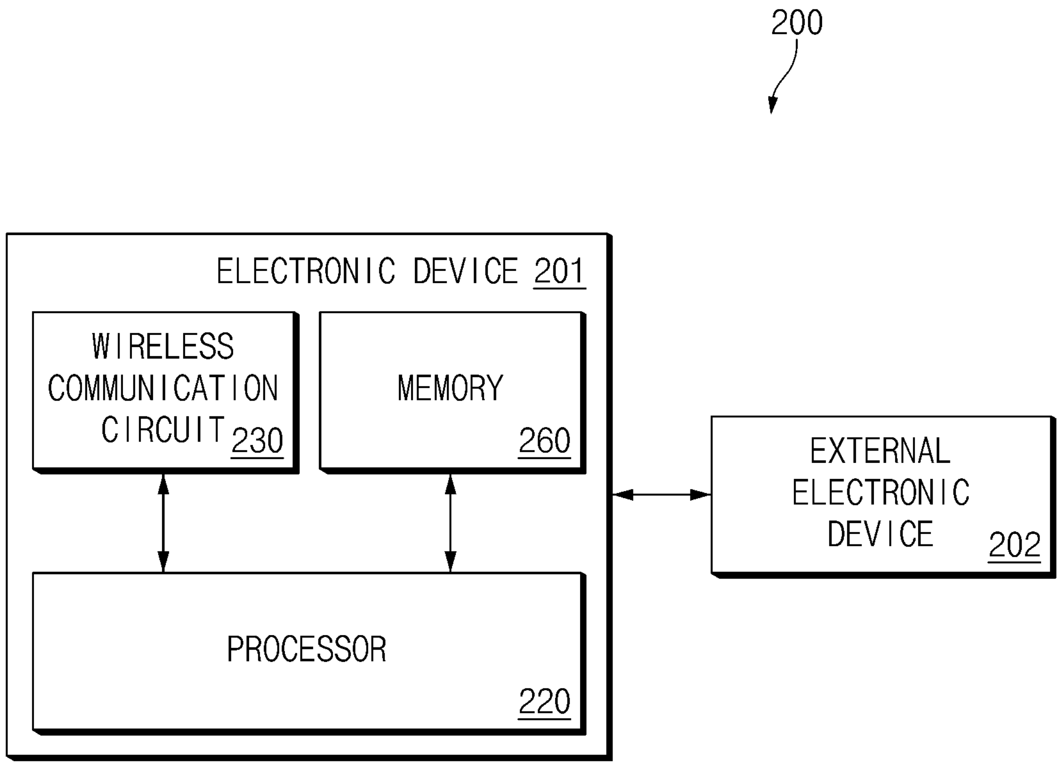
FIG. 2 is a block diagram illustrating components of an electronic device, according to various embodiments.

FIG. 2 is a block diagram 200 illustrating components of an electronic device, according to various embodiments.

Referring to FIG. 2, an electronic device 201 (e.g., the electronic device 101 of FIG. 1) may include a processor 220 (e.g., the processor 120 of FIG. 1), a wireless communication circuit 230 (e.g., the communication module 190 of FIG. 1), and/or a memory 260 (e.g., the memory 130 of FIG. 1). The configuration of the electronic device 201 illustrated in FIG. 2 is exemplary, and embodiments of the disclosure are not limited thereto. For example, the electronic device may not include at least one of the components illustrated in FIG. 2. For another example, the electronic device may further include a component not illustrated in FIG. 2. For example, the external electronic device 202 may include substantially the same component as at least one of the components of the electronic device 201.

According to an embodiment, the processor 220 may be operatively connected to the wireless communication circuit 230 and the memory 260.

According to an embodiment, the wireless communication circuit 230 may be configured to support short-range wireless communication based on a wireless local area network (WLAN) and/or Bluetooth protocol (e.g., legacy Bluetooth and/or Bluetooth Low Energy (BLE)). For example, the wireless communication circuit 230 may transmit and/or receive a wireless signal based on Wi-Fi communication or Bluetooth communication with the external electronic device 202. The wireless communication circuit 230 may broadcast a specified signal (e.g., a first signal including first data and/or a second signal including second data) based on a specified interval. The wireless communication circuit 230 may receive a trigger frame signal transmitted from the external electronic device 202.

According to an embodiment, the memory 260 may store one or more instructions that, when executed, cause the processor 220 to perform various operations of the electronic device 201. For example, the memory 260 may temporarily store data generated in the process of the electronic device 201 performing communication. For example, the memory 260 may store target wake time (TWT) setting information (e.g., settings), and the TWT setting information may include, but not be limited to, information about a TWT identifier (ID), a service type assigned to the TWT, a service period and/or duration of the TWT, or a TWT interval.

According to an embodiment, the processor 220 may perform a communication function with external electronic devices based on the TWT based on the quality of service (QoS) individually related to at least one service type supportable by the electronic device 201 and the external electronic device 202 (e.g., voice (VO), video (VI), best effect (BE), and/or background (BK)). For example, the TWT is a term defined in the IEEE 802.11ax standard, and according to various embodiments of the disclosure, may be used for the purpose of dynamically allocating radio resources (e.g., wireless medium and/or wireless communication channel) to electronic devices (e.g., the electronic device 201 and/or the external electronic device 202) according to service types requested by the electronic devices (e.g., allocating access time to radio resources differently for each service type).

For example, the processor 220 may set the TWT by changing TWT setting information (e.g., TWT settings) for each service type. Electronic devices, for example, may refer to the TWT ID in the TWT information element of the beacon frame defined in the 802.11ax standard to identify TWT setting information (e.g., the wake time, service period, and/or interval).

In an embodiment, the processor 220 may monitor data throughput for each service type for a specified period. The data throughput may be defined as the quantity of data transmitted and/or received by the electronic device to and from the external electronic device 202 per unit time. The processor 220 may, for example, change the TWT service time for each service type based on the data throughput.

According to an embodiment, the electronic device 201 may maintain a wake-up state during a service period at every specified interval from the wake time based on TWT setting information and operate in a sleep state, and/or a dozing state other than the service period, thereby reducing power consumption. For example, in the sleep state, the electronic device 201 may operate in a low power mode and/or deactivate at least some functions of the electronic device 201.

According to an embodiment, after the first signal is broadcasted, the processor 220 may detect the second external electronic device using radio resources for communication with the electronic device 201 and the external electronic device 202 from among a plurality of external electronic devices. For example, if the electronic device 201 corresponds to a very low power (VLP) device and/or if the electronic device 201 performs the communication function with low power, at least one of the second external electronic devices may not detect the first signal broadcasted by the electronic device 201. In this case, a collision may occur if at least one second external electronic device that fails to detect the first signal uses radio resources for communication with the external electronic device 202. The electronic device 201 may broadcast the first signal based on the specified interval and calculate usage of radio resources by at least one of a plurality of external electronic devices based on the specified interval. If it is determined that the calculated number of detections exceeds a specified value, the electronic device 201 may perform TWT negotiation to communicate with the external electronic device 202 by enabling a trigger-enabled option.

According to an embodiment, the processor 220 may broadcast the first signal including the first data based on the specified interval through the wireless communication circuit 230. For example, the first data may include a physical layer (PHY) header including subfield values corresponding to rate and/or length. For example, the processor 220 may set values of subfield corresponding to rate and/or length to specified values. For example, the processor 220 may set values of subfields corresponding to rate and/or length to values required for communication with the external electronic device 202, and then broadcast the first signal including first data. For example, by broadcasting the first signal, the processor 220 may prevent other external electronic devices receiving the first signal from using radio resources for communication with the external electronic device 202 for a specified period of time. That is, the electronic device 201 may prevent collisions with external electronic devices by performing the above operation. The processor 220 may calculate a delay time for preventing other external electronic devices from using a radio resource in the same frequency band as the electronic device 201 by using values of subfields corresponding to rate and/or length. Then, the processor 220 may determine whether at least one other external electronic device uses a radio resource for communication with the electronic device 201 and the external electronic device 202 based on the calculated delay time. The subfields corresponding to rate and/or length are described below with reference to FIG. 6.

According to an embodiment, if it is determined that the number of at least one external electronic device using the radio resource exceeds a specified value, the processor 220 may perform communication with the external electronic device 202 based on a trigger frame signal transmitted from the external electronic device 202. For example, the processor 220 may transmit a second signal including second data to the external electronic device 202 in response to the trigger frame signal received from the external electronic device 202. As an example, the second data may include at least one of a power saving (PS)-poll frame, an unscheduled-automatic power saver delivery (U-APSD) frame, and a null frame. As another example, the second signal may include a request signal for updating the TWT setting information. After receiving the second signal, the external electronic device 202 may determine that the electronic device 201 is in a communicable state. The operation of the electronic device 201 described above may be referred to as a trigger-enabled option among TWT functions. For example, the processor 220 may enable the trigger-enabled option by performing TWT negotiation to change a flow type field value included in the TWT setting information to perform communication with the external electronic device 202.

According to another embodiment, if the electronic device 201 determines that the number of detections calculated through the operation of detecting at least one second external electronic device using radio resources for communication with the electronic device 201 and the external electronic device 202 does not exceed the specified value, the electronic device 201 may continuously monitor (e.g., a carrier sensing operation) the at least one second external electronic device based on the specified interval. Alternatively or additionally, if the number of detections does not exceed the specified value, the electronic device 201 may perform communication with the external electronic device 202 in a state in which the trigger-enabled option is not enabled. For example, if the electronic device 201 is performing communication with the external electronic device 202 in the state in which the trigger-enabled option is enabled before performing the detection operation, the electronic device 201 may perform TWT negotiation with the external electronic device 202 to disable the trigger-enabled option. For another example, if the electronic device 201 is performing communication with the external electronic device 202 in the state in which the trigger-enabled option is disabled before performing the detection operation, the electronic device 201 may continue to perform the communication operation based on existing TWT setting information without performing TWT negotiation.

According to an embodiment, the electronic device 201 may determine whether a radio resource for performing communication with the external electronic device 202 is in use by Wi-Fi communication or Bluetooth communication between a plurality of electronic devices. For example, the electronic device 201 may perform the TWT negotiation based on whether the radio resource is used or not, and may perform communication with the external electronic device 202 through TWT setting information set according to the TWT negotiation. For example, after performing the TWT negotiation, the electronic device 201 may perform communication with the external electronic device 202 based on the announced TWT. The announced TWT may correspond to a TWT function of enabling the electronic device 201 to perform communication with the external electronic device 202 (e.g., receive data from the external electronic device 202) after a signal including specified data (e.g., the second data) is transmitted to the external electronic device 202. For example, the electronic device 201 may perform communication with the external electronic device 202 based on the announced TWT by performing TWT negotiation to change a trigger subfield value included in the TWT setting information based on whether radio resources are used by a plurality of external electronic devices.

According to an embodiment, when performing the TWT negotiation with the external electronic device 202, the electronic device 201 may set the TWT interval included in the TWT setting information to a specified interval. That is, the electronic device 201 may perform communication with the external electronic device 202 based on a first interval set according to the TWT negotiation. For example, if the electronic device 201 executes a first service to communicate with the external electronic device 202, the electronic device 201 may transition from a sleep state to a wake-up state every first interval. For another example, if the electronic device 201 communicates with the external electronic device 202 by executing a second service (e.g., voice over IP (VoIP) service), the electronic device 201 may transition from the sleep state to the wake-up state every second interval longer than the first interval. The sleep state of the electronic device 201 may be referred to as a state in which the electronic device 201 operates with relatively little power compared to the wake-up state or an idle state. The wake-up state (or awake state) of the electronic device 201 may be referred to as a state of the electronic device 201 configured to be communicable with the external electronic device 202. As an example, the first interval may correspond to an interval of traffic generated while the electronic device 201 executes the first service (e.g., a game service or a video service). As another example, the second interval may correspond to an interval of traffic generated while the electronic device 201 executes the second service. The electronic device 201 transitioned to the wake-up state may transmit a signal including specified data to the external electronic device 202. The external electronic device 202 may receive the signal including the specified data and determine that the electronic device 201 is in a communicable state.

In FIG. 2, each trigger-enabled or announced TWT option enabled and/or disabled by the electronic device 201 through TWT negotiation may be independently utilized. For example, when performing TWT negotiation, the electronic device 201 may determine whether to activate the announced TWT option regardless of whether the trigger-enabled option is enabled.

Figure 3:
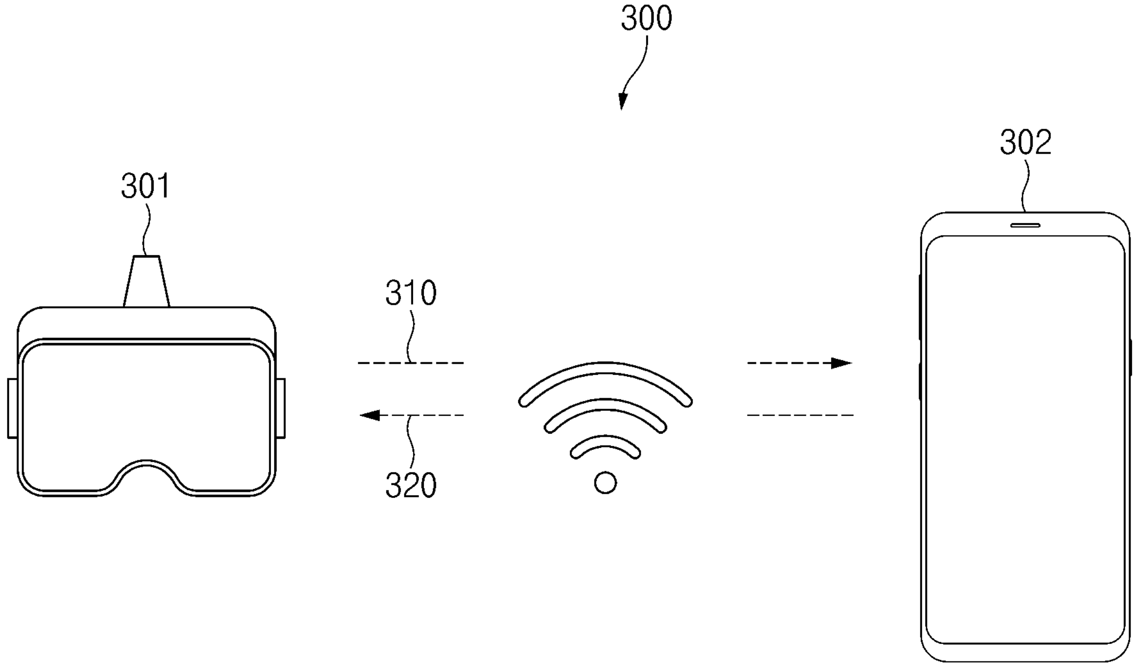
FIG. 3 is a conceptual diagram illustrating a communication operation between an electronic device and an external electronic device, according to various embodiments.

FIG. 3 is a conceptual diagram 300 illustrating a communication operation between an electronic device 301 and an external electronic device 302, according to various embodiments.

According to an embodiment, the electronic device 301 (e.g., the electronic device 101 of FIG. 1) may perform communication with a plurality of external electronic devices 302 (e.g., the external electronic device 302). The electronic device 301, for example, may transmit (310) data including at least one image acquired using a camera (not shown) to the external electronic device 302. The electronic device 301 may be referred to as a very low power (VLP) device or a device supporting a low power data transmission/reception function.

According to an embodiment, the external electronic device 302 may receive data including at least one image from the electronic device 301, and may transmit (320), to the electronic device 301, at least one AR image for which rendering is performed based on the received data.

According to an embodiment, the electronic device 301 and the external electronic device 302 may experience problems due to excessive power consumption while performing data transmission/reception operations. Accordingly, power consumption may be reduced by transmitting and receiving data between the electronic device 301 and/or the external electronic device 302 based on the VLP transmission technology. For example, the electronic device 301 (e.g., a head mounted display (HMD) device) using the VLP transmission technology may have increased usability by reducing the capacity of the battery to reduce the size and weight of the electronic device 301. However, various problems may occur when the electronic device 301 and the external electronic device 302 perform the VLP operation. For example, the electronic device 301 uses the low power data transmission/reception function when transmitting and receiving data using radio resources, and as a consequence, it may be likely that other external electronic devices are not be able to identify the communication operation of the electronic device 301. In this case, problems of collision and/or interference may occur since other external electronic devices may use (or occupy) radio resources used by the electronic device 301 and the external electronic device 302. In this case, the electronic device 301 may selectively utilize the trigger-enabled option to prevent the aforementioned problems. For example, the electronic device 301 may initiate the communication operation with the external electronic device 302 by transmitting a specified signal (e.g., a power saving (PS)-poll frame, an unscheduled-automatic power saver delivery (U-APSD) frame, or a null frame) in response to a trigger frame signal transmitted from the external electronic device 302. The trigger-enabled option is described below with reference to FIGS. 4 to 7.

Figure 4:
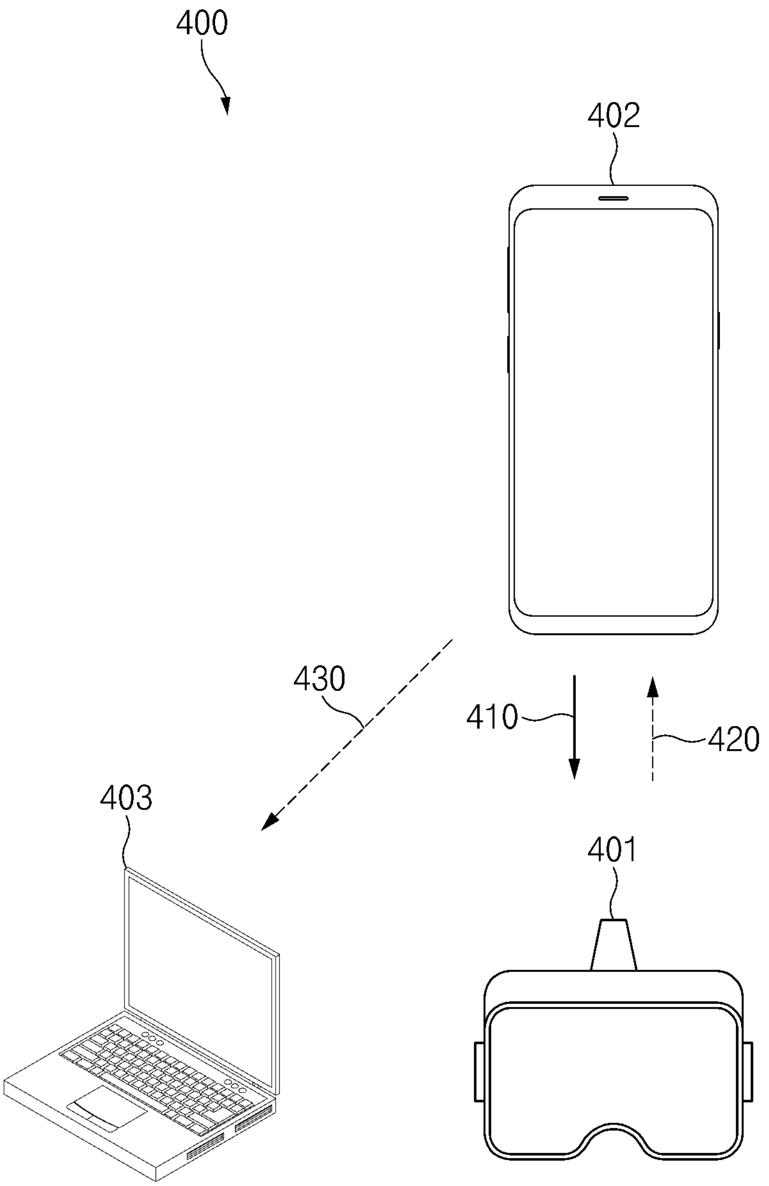
FIG. 4 is a conceptual diagram illustrating a communication operation between an electronic device and an external electronic device, according to various embodiments.

FIG. 4 is a conceptual diagram 400 illustrating a communication operation between an electronic device 401 and an external electronic device 402, according to various embodiments.

According to an embodiment, the electronic device 401 (e.g., the electronic device 101 of FIG. 1) may perform efficient communication operations using a trigger-enabled option. For example, the electronic device 401 may receive (410) a trigger frame signal from a first external electronic device 402 (e.g., the external electronic device 202 of FIG. 2 or the external electronic device 302 of FIG. 3). In the state in which the trigger-enabled option is enabled, the electronic device 401 may not perform a communication function (e.g., data transmission) until receiving the trigger frame signal from the first external electronic device 402.

According to an embodiment, the electronic device 401 may perform communication with the first external electronic device 402 based on the trigger frame signal transmitted from the first external electronic device 402. For example, the electronic device 401 may receive the trigger frame and transmit (420) a second signal including second data to the first external electronic device 402. As an example, the second data may include at least one of a power saving (PS)-poll frame, an unscheduled-automatic power saver delivery (U-APSD) frame, and a null frame. The first external electronic device 402 may determine that the electronic device 401 is in a state in which the communication operation is performed, by receiving the second signal.

According to an embodiment, the trigger frame signal transmitted by the first external electronic device 402 may also be transmitted (430) to the second external electronic device 403. For example, the second external electronic device 403 may determine that external electronic device 402 is performing the communication function based on the trigger frame signal transmitted from the first external electronic device 402. By the second external electronic device 403 receiving the trigger frame signal transmitted from the first external electronic device 402 to the electronic device 401, the electronic device 401 and the first external electronic device 402 may not use (or occupy) radio resources being used for communication, thereby reducing collisions in using radio resources. For example, the second external electronic device 403 may not use radio resources being used for communication by the electronic device 401 and the first external electronic device 402 for a specified period of time.

Figure 5:
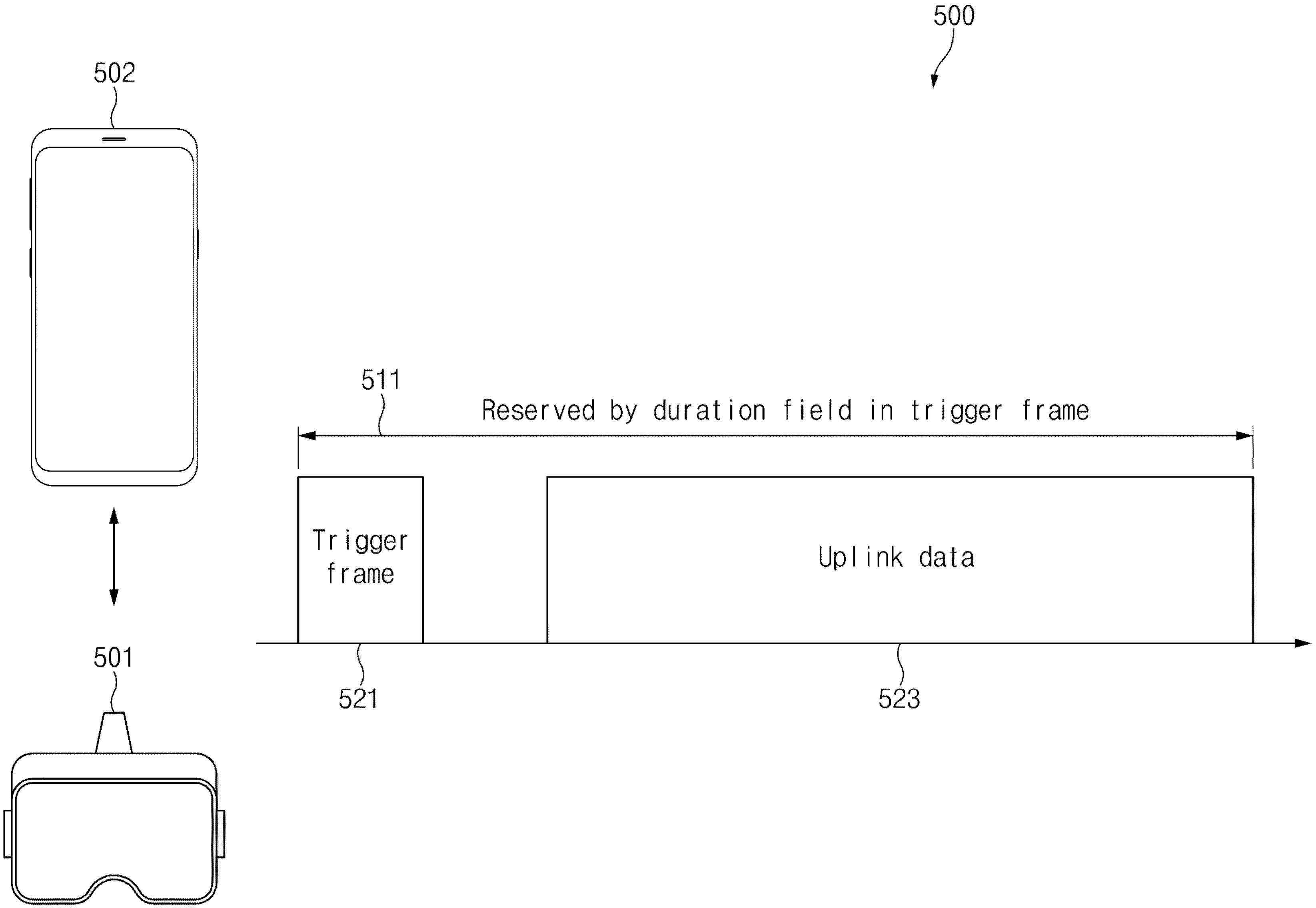
FIG. 5 is an operation diagram illustrating an operation sequence of an electronic device and an external electronic device over time, according to various embodiments.

FIG. 5 is an operation diagram 500 illustrating an operation sequence of an electronic device 501 and an external electronic device 502 over time, according to various embodiments.

According to an embodiment, the electronic device 501 (e.g., the electronic device 101 of FIG. 1) may perform a communication operation based on TWT setting information previously negotiated with the first external electronic device 502. For example, the TWT setting information may include information on whether a trigger-enabled option is enabled.

Referring to reference numeral 521, the electronic device 501 may receive a trigger frame signal from the external electronic device 502. The trigger frame signal may include information on an entire section 511 through which the electronic device 501 and the external electronic device 502 perform communication (e.g., time information of the section and/or interval information of the section). For example, transmission time information about uplink data transmitted in response to the trigger frame signal may be included in a media access control (MAC) header duration field in the trigger frame signal.

Referring to reference numeral 523, the electronic device may transmit uplink data based on the trigger frame signal transmitted from the external electronic device 502. For example, the uplink data may include at least one of a power saving (PS)-poll frame, an unscheduled-automatic power saver delivery (U-APSD) frame, and a null frame.

Figure 6:
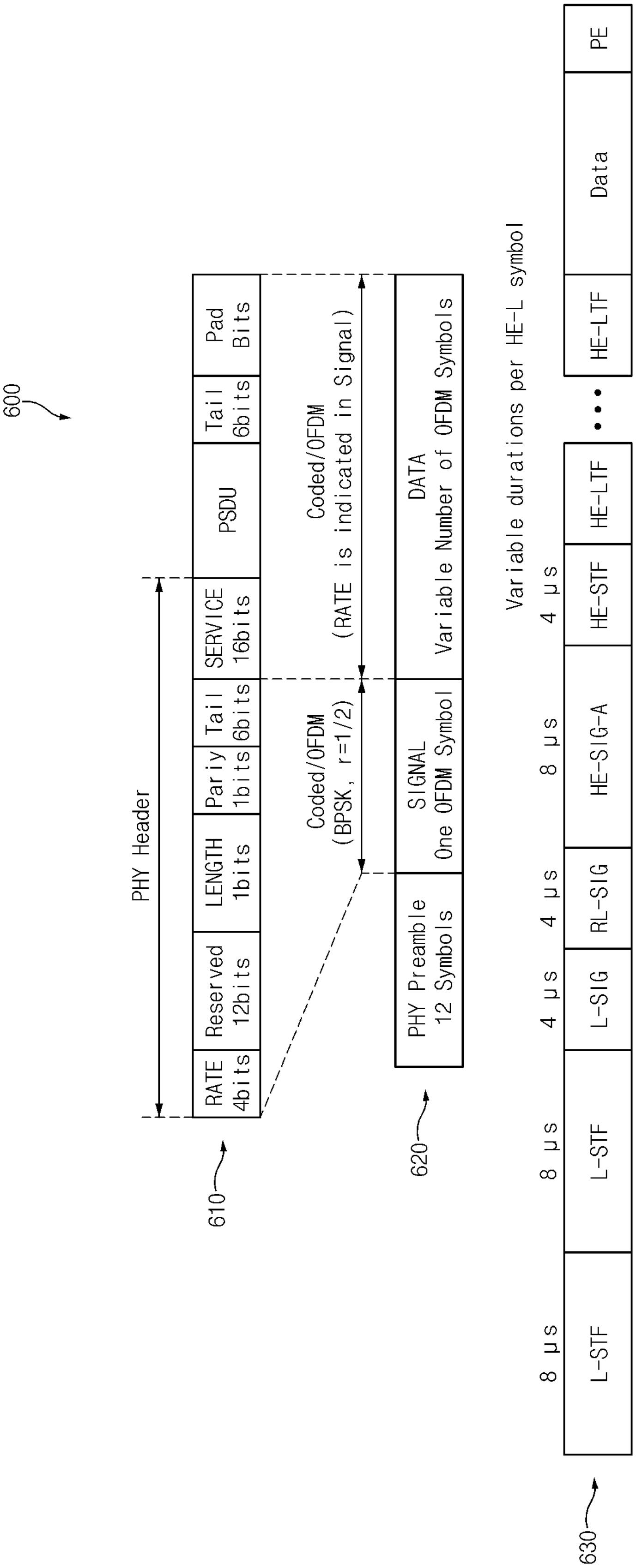
FIG. 6 is a diagram illustrating an exemplary format of a target wake time (TWT) element, according to various embodiments.

FIG. 6 is a diagram illustrating an exemplary format 600 of a target wake time (TWT) element, according to various embodiments.

According to an embodiment, tables referenced with reference numerals 610 and 620 may be referred to as a frame format defined in the legacy 802.11 standard. The frame format may be divided into physical (PHY) Preamble, PHY Header, and Data. For example, the PHY Preamble may be used for synchronization of communication operations and may be a field consisting of 12 symbols. The PHY Header may include a SIGNAL field and a SERVICE field. After the SERVICE field, that is, the SERVICE field, a physical layer convergence procedure (PLCP) service data unit (PSDU), a Tail bit, and a Pad bit may be defined as a DATA section. For example, in order to perform a clear channel assessment (CCA) operation for carrier sense multiple access/collision avoidance (CSMA/CA) in WLAN communication, the electronic device 501 may change values corresponding to the rate subfield and length subfield included in the PHY header. A value corresponding to the rate subfield may be referred to as, for example, a PSDU transmission rate. A value corresponding to the length subfield may be referred to as, for example, the number of bytes of the PSDU. For example, an electronic device (e.g., the first external electronic device 402 of FIG. 4) may transmit an electrical signal including the above-described frame format to an external electronic device (e.g., the second external electronic device 403 of FIG. 4). Based on the received electrical signal, the external electronic device 403 may calculate a delay time for using a radio resource by referring to the length subfield and the rate subfield included in the electrical signal. Accordingly, the external electronic device 403 may delay the communication operation by the amount of time taken for the electronic device 402 to perform communication with other electronic devices (e.g., the electronic device 401 of FIG. 4), that is, the calculated delay time for using the radio resource. A calculation equation for calculating the delay time for using the radio resource may be referred to as the following equation.

$$\frac{\text{length} * 8}{\text{rate}} \quad \text{[Equation 1]}$$

According to an embodiment, a table referenced with reference numeral 630 may be referred to as a frame format defined in the IEEE 802.ax amendment. For example, the table according to reference numeral 630 may be referred to as an example of a PHY physical layer protocol data unit (PPDU) packet format defined in 802.11ax. The legacy short training field (L-STF) field may be referred to as a non-high throughput (Non-HT) Short Training field. The legacy long training field (L-LTF) field may be referred to as a Non-HT Long Training field. The legacy SIGNAL (L-SIG) field may be referred to as a Non-HT SIGNAL field. For example, the L-STF, L-LTF, and L-SIG fields may mean legacy fields for backward compatibility. As another example, the L-LTF field may further include information for channel estimation to be performed to demodulate the L-SIG field. The RL-SIG field may be referred to as a Repeated Non-HT SIGNAL field. The HE-SIG-A field may be referred to as a HE SIGNAL A field. The HE-SIG-B field may be referred to as a HE SIGNAL B field. The HE-STF field may be referred to as a HE Short Training field. The HE-LTF field may be referred to as a HE Long Training field. The Data field may be referred to as the Data field carrying the PSDU(s) field. The PE field may be referred to as a Packet field. For example, a signal field in a legacy PHY header may be included in the L-SIG field. For example, the electronic device may set the value of the rate subfield in the L-SIG field to a specified value (e.g., 6 Mbps), and may set the value of the length subfield to a specified value (e.g., a value set to calculate the delay time calculated by Equation 1).

Figure 7:
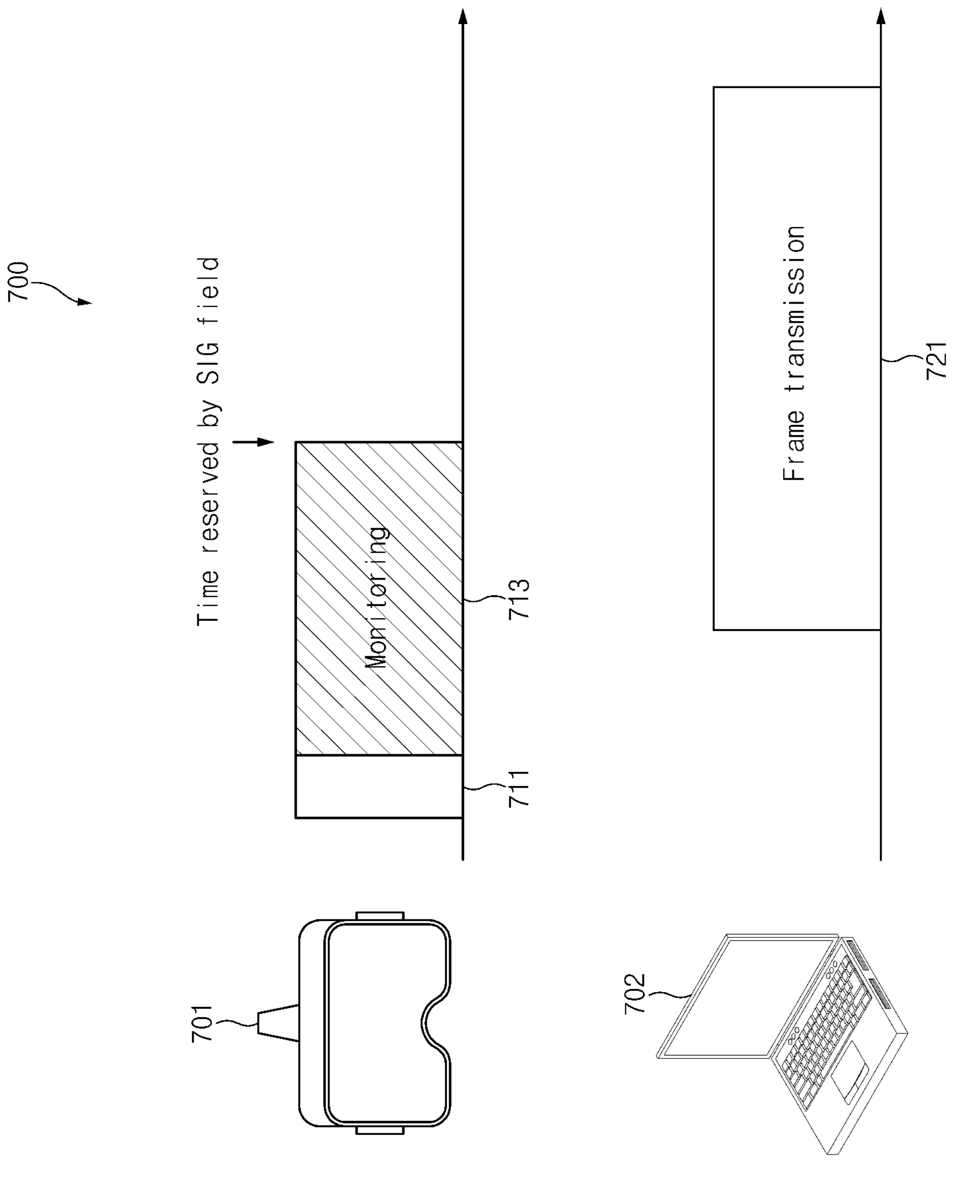
FIG. 7 is an operation diagram illustrating an operation sequence of an electronic device and an external electronic device over time, according to various embodiments.

FIG. 7 is an operation diagram illustrating an operation sequence 700 of an electronic device 701 and an external electronic device 702 over time, according to various embodiments.

Referring to reference numeral 711, the electronic device 701 may broadcast a first control signal including first data based on a specified interval. For example, the first control signal broadcast by the electronic device 701 may include first data in which values corresponding to the rate subfield and the length subfield are set by a specified equation. For example, the first signal may be referred to as a control signal that causes the electronic devices to delay the use of a radio resource by the delay time calculated by the specified equation. According to an embodiment, the electronic device 701 may broadcast the first signal based on a specified interval regardless of whether the trigger-enabled option is enabled. For example, if the electronic device 701, in the state in which the trigger-enabled option is enabled, does not identify any external electronic device responding to the first signal, the electronic device 701 may disable the trigger-enabled option. For another example, if the electronic device 701, in the state in which the trigger-enabled option is disabled, identifies at least one external electronic device responding to the first signal, the electronic device 701 may enable the trigger-enabled option.

Referring to reference numeral 713, the electronic device 701 may perform an operation (e.g., carrier sensing operation) of monitoring the state of a radio resource during a predetermined section (e.g., short interframe space (SIFS), point coordination function (PCF) IFS (PIFS)). In an embodiment, the above-described carrier sensing operation may be referred to as a clear channel assessment (CCA) operation. For example, the electronic device 701 may identify whether there are external electronic devices (e.g., the external electronic device 702) that use (or occupy) radio resources during a specified section based on the first signal broadcast in reference numeral 711 (e.g., the section of monitoring that corresponds to reference numeral 713). That is, the external electronic device 702 identified by the electronic device 701 performing the CCA operation may exist at a location spaced apart from the electronic device 701 by a specified distance (e.g., a distance at which VLP communication may be detected) or more. Alternatively or additionally, the external electronic device 702 may be referred to as an external electronic device that does not detect the electronic device 701 performing a low power communication operation. For example, the external electronic device 702 identified by the electronic device 701 may not detect the low power communication operation (e.g., VLP communication operation) of the electronic device 701, and may be referred to as an electronic device which performs a communication operation with another external electronic device (e.g., the external electronic device 202 of FIG. 2).

Referring to reference numeral 721, the electronic device 701 may determine that the external electronic device 702 is using a radio resource within a specified section. In FIG. 7, the external electronic device 702 monitored by the electronic device 701 is illustrated as one device, however, embodiments of the disclosure are not limited thereto. For example, after broadcasting the first signal, the electronic device 701 may detect at least one external electronic device (e.g., the external electronic device 702) using radio resources that the electronic device 701 intends to use, from among a plurality of external electronic devices.

According to an embodiment, the electronic device 701 may repeatedly perform an operation of detecting at least one external electronic device (e.g., the external electronic device 702) based on the specified interval in which the first signal is broadcast. The electronic device 701 may repeatedly perform the detection operation and calculate the number of times that at least one external electronic device (e.g., the external electronic device 702) has been detected. For example, the electronic device may perform an operation of detecting at least one external electronic device (e.g., the external electronic device 702) based on the first signal broadcast based on a specified interval for a specified time.

According to an embodiment, the electronic device 701 may calculate the number of detections through the detecting based on the specified interval. The electronic device 701 may perform communication with another external electronic device (e.g., the external electronic device 202 of FIG. 2) with which the electronic device 701 intends to perform communication based on a trigger frame signal transmitted from the other external electronic device if a determination is made that the calculated number of detections exceeds a specified value. For example, the electronic device 701 may transmit a second signal including second data to the other external electronic device in response to the trigger frame signal received from the other external electronic device. As an example, the second data may include at least one of a power saving (PS)-poll frame, an unscheduled-automatic power saver delivery (U-APSD) frame, and a null frame.

According to an embodiment, the electronic device 701 may perform TWT negotiation to change the flow type field value included in the TWT setting information with the other external electronic device, and then perform communication based on the above-described communication method. For example, the communication method performed may be referred to as the trigger-enabled option if it is determined that the number of external electronic devices using radio resources within a specified section exceeds a specified value.

Figure 8:
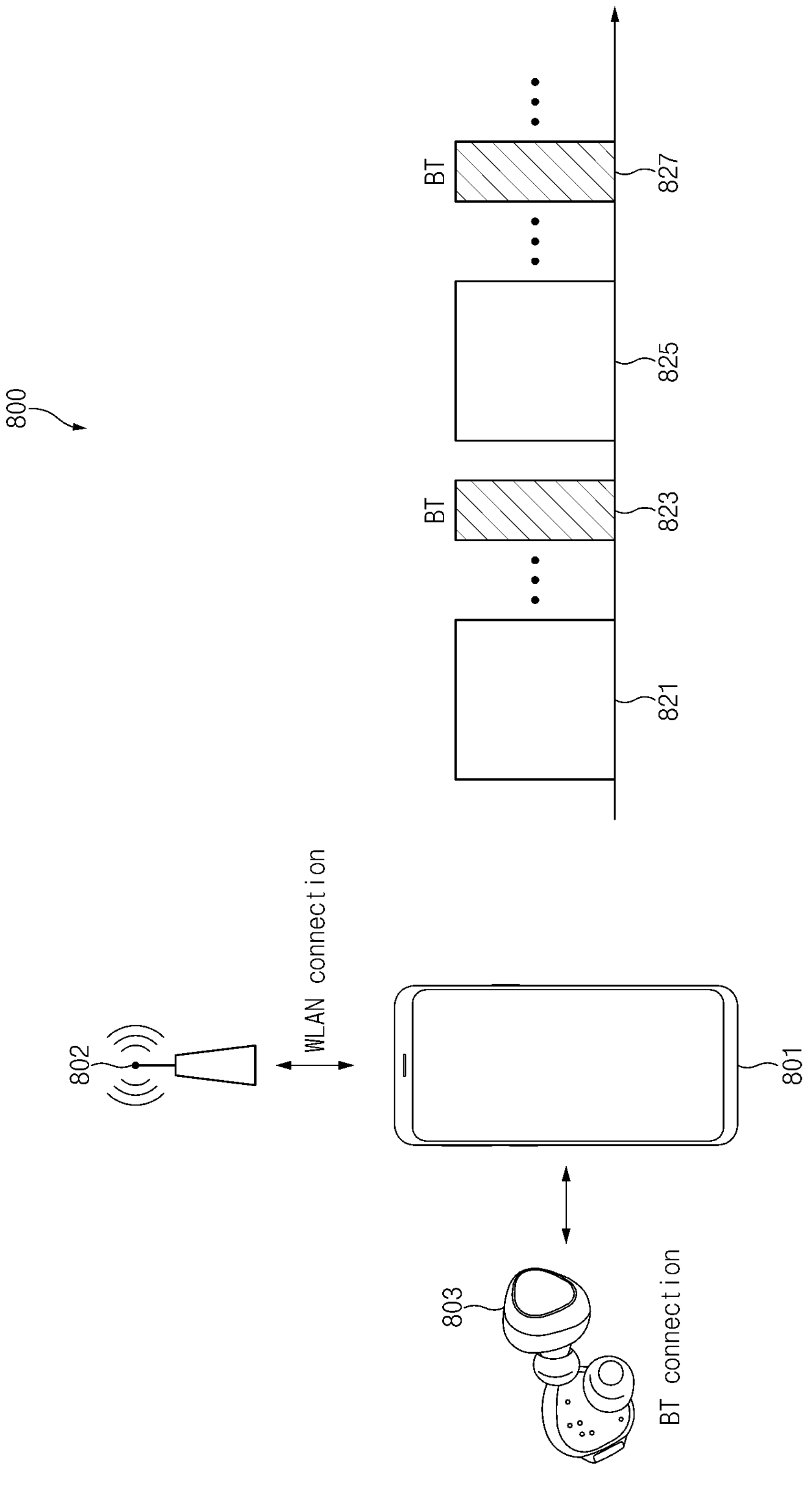
FIG. 8 is an operation diagram illustrating an operation sequence of an electronic device and external electronic devices over time, according to various embodiments.

FIG. 8 is an operation diagram 800 illustrating an operation sequence of an electronic device 801 and external electronic devices 802 and 803 over time, according to various embodiments.

According to an embodiment, the electronic device 801 (e.g., the electronic device 101 of FIG. 1) may perform communication with an external electronic device (e.g., the first external electronic device 802, the second external electronic device 803) based on Wi-Fi communication and/or Bluetooth communication. For example, the electronic device 801 may use a radio resource (e.g., a Wi-Fi channel) of a 2.4 GHz or 5 GHz unlicensed band to perform communication. In an embodiment, the unlicensed band may be referred to as an industrial, scientific, and medical (ISM) band. That is, the unlicensed band may refer to a frequency band for which a license and/or permission for use are not required. For example, the electronic device 801 may perform communication with the first external electronic device 802 (e.g., an access point (AP)) based on Wi-Fi communication. For another example, the electronic device 801 may perform communication with the second external electronic device 803 (e.g., a wireless earphone) based on Bluetooth communication.

According to an embodiment, the electronic device 801 may perform communication using radio resources of the same frequency band (e.g., 2.4 GHz or 5 GHz band) over time. For example, in a section corresponding to reference numeral 821, the electronic device 801 may use (or occupy) radio resources by performing Wi-Fi communication. In a section corresponding to reference numeral 823, after a certain time has elapsed from the section corresponding to reference numeral 821, the electronic device 801 may use radio resources by performing Bluetooth communication. In a section corresponding to reference numeral 825, after a certain time has elapsed from the section corresponding to reference numeral 823, the electronic device 801 may use radio resources by performing WiFi communication again. In a section corresponding to reference numeral 827, after a certain time has elapsed from the section corresponding to reference numeral 825, the electronic device 801 may use radio resources by performing Bluetooth communication again.

For each section corresponding to reference numerals 821, 823, 825, and 827 of FIG. 8, the electronic device 801 is illustrated as using radio resources using different communication methods (e.g., Wi-Fi communication, Bluetooth communication), respectively. However, there may be an attempt to perform communication by using different communication methods in one section. For example, the electronic device 801 may perform communication with the first external electronic device 802 (e.g., an access point (AP)) and/or the second external electronic device 803 (e.g., wireless earphone) by controlling a wireless communication circuit (e.g., the communication module 190 of FIG. 1 or the wireless communication circuit 230 of FIG. 2), and some of the data transmitted from the first external electronic device 802 and the second external electronic device 803 may overlap. That is, co-existing (e.g., overlapping) communication may occur in some sections in which the electronic device 801 performs communication.

Figure 9:
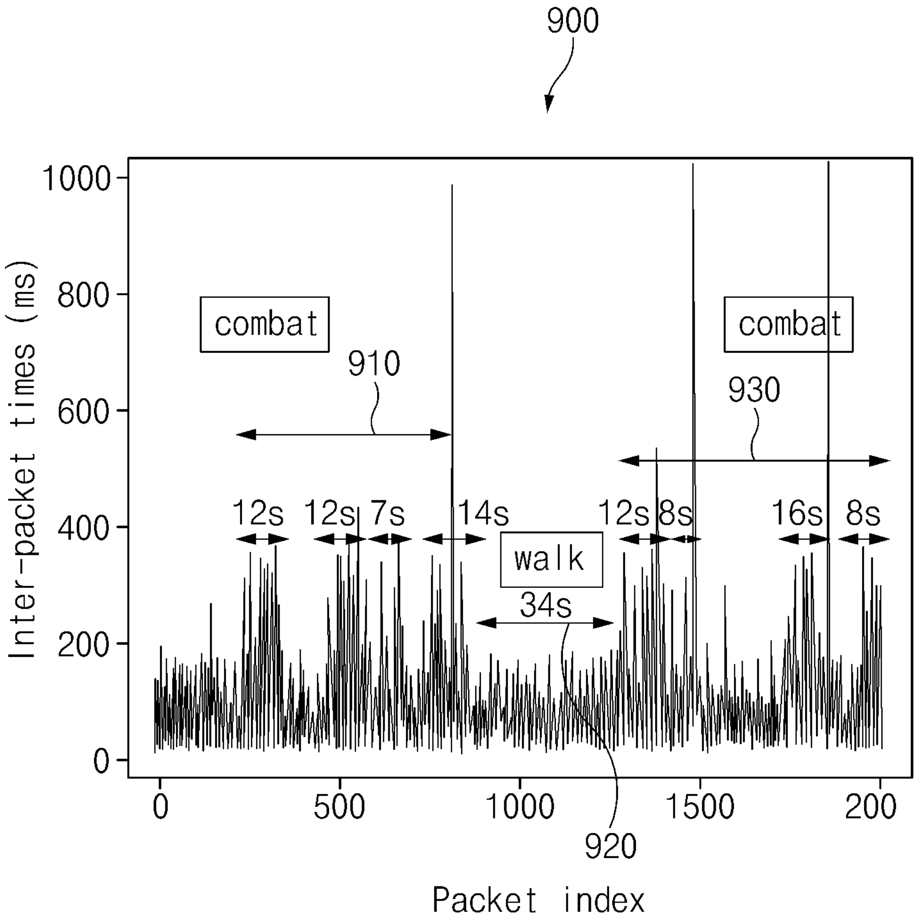
FIG. 9 is a diagram illustrating a table representing data throughput according to an operating state of an electronic device, according to various embodiments.

FIG. 9 is a diagram illustrating a table 900 representing data throughput according to an operating state of an electronic device, according to various embodiments.

Referring to the table 900 of FIG. 9, in the electronic device (e.g., the electronic device 101 of FIG. 1), parameter values (e.g., the TWT interval or data throughput) that are included in the TWT setting information may be different according to the type of service to be executed. For example, the TWT interval and data throughput when the electronic device executes the first services 910 and 930 (e.g., a game service or a video service) may be referred to as a first interval and a first throughput, respectively. For another example, the TWT interval and data throughput when the electronic device executes the second service 920 (e.g., a voice over IP (VoIP) service) may be referred to as a second interval and second throughput, respectively. The first interval and the second interval may correspond to intervals of traffic generated while the first service and the second service are executed in the electronic device, respectively.

According to an embodiment, if the electronic device executes the first service to communicate with an external electronic device, the electronic device may transition from a sleep state to a wake-up state every first interval. After transitioning to the wake-up state, the electronic device may transmit a second signal including second data to the external electronic device. For example, the second data may include at least one of a power saving (PS)-poll frame, an unscheduled-automatic power saver delivery (U-APSD) frame, and a null frame.

According to an embodiment, if the electronic device executes the second service to communicate with the external electronic device, the electronic device may transition from the sleep state to the wake-up state every second interval longer than the first interval. For example, the electronic device may transition to the wake-up state every second interval and may transmit/receive data that is associated with the second service to/from the external electronic device. For the electronic device, the amount of traffic generated in the process of transmitting/receiving data associated with the second service may be less than the amount of traffic generated in the process of transmitting/receiving data associated with the first service.

Figure 10:
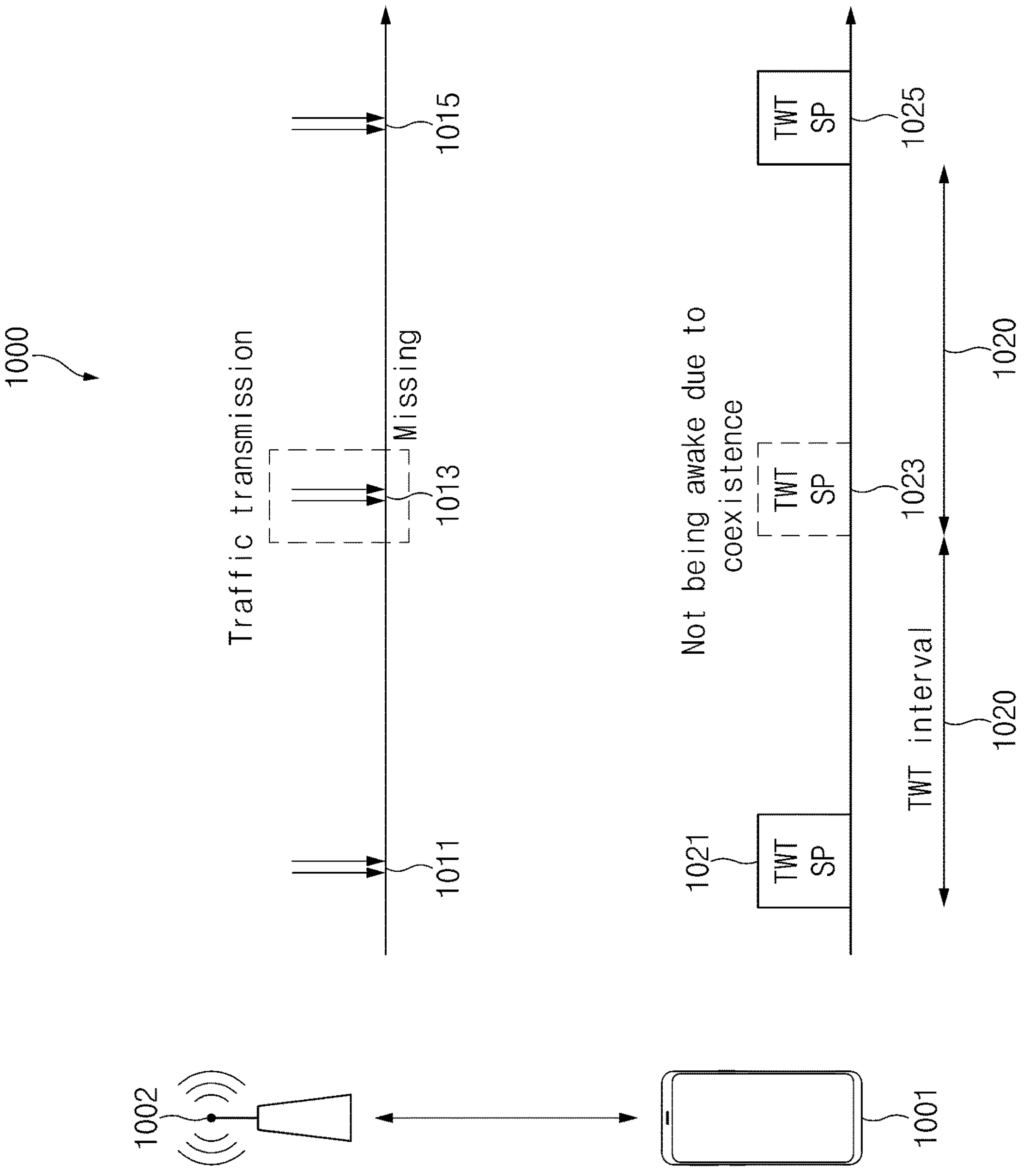
FIG. 10 is an operation diagram illustrating an operation sequence of an electronic device and an external electronic device over time, according to various embodiments.

FIG. 10 is an operation diagram 1000 illustrating an operation sequence of an electronic device 1001 and an external electronic device 1002 over time, according to various embodiments.

According to various embodiments, the electronic device 1001 may perform communication in various ways based on TWT negotiation with the external electronic device 1002.

According to an embodiment, the electronic device 1001 may perform communication with the external electronic device 1002 through an unannounced TWT that allows communication under the assumption that the electronic device 1001 is in an active state (e.g., intervals corresponding to reference numerals 1021, 1023, and 1025) in which transmitting and/or receiving of data is allowed for each specified interval (e.g., TWT interval) 1020. For example, in an unannounced TWT state, the external electronic device 1002 may determine that the electronic device 1001 is in the active state in which transmitting and/or receiving of data is allowed every TWT interval 1020, and may transmit data to the electronic device 1001 at reference numerals 1011 to 1015. In this case, in reference numeral 1013, if the electronic device 1001 is in a co-existing communication state, data transmitted from the external electronic device 1002 may be missing (e.g., traffic missing). For example, the electronic device 1001 may perform communication during a TWT service period (SP) based on a TWT interval set through TWT negotiation with the external electronic device 1002. The electronic device 1001 may perform communication with the external electronic device 1002 based on Wi-Fi communication during the TWT SP. For example, the electronic device 1001 may not perform communication with the external electronic device 1002 if a radio resource use request based on external communication excluding Wi-Fi communication is received in the TWT SP corresponding to reference numeral 1023. As an example, the electronic device 1001 may not receive data transmitted from the external electronic device 1002 if the radio resource use request based on Bluetooth communication is received in the TWT SP corresponding to reference numeral 1023.

According to an embodiment, the electronic device 1001 may transmit (e.g., broadcast) specified data (e.g., a power saving (PS)-poll frame, unscheduled-automatic power saver delivery (U-APSD) frame, or null frame) at each specified interval, and then perform communication with the external electronic device 1002 through the announced TWT that allows communication. For example, in the announced TWT state, the electronic device 1001 may transmit specified data to the external electronic device 1002 every TWT interval, and receive data transmitted from the external electronic device 1002 in response thereto. That is, the electronic device 1001 may request the external electronic device 1002 to transmit data only if the electronic device 1001 may operate in the active state in the sections corresponding to reference numerals 1021, 1023, and 1025. For example, in reference numeral 1023, if the electronic device 1001 is in the co-existing communication state, the electronic device 1001 may prevent missing of data received from the external electronic device 1002 by not transmitting the specified data to the external electronic device 1002. Therefore, it may be desirable for the electronic device 1001 to determine whether the communication state is a co-existing state, and to perform communication with the external electronic device 1002 selectively using the announced TWT. The electronic device 1001 may, for example, perform TWT negotiation to change a trigger subfield value included in the TWT setting information based on whether radio resources are used by a plurality of external electronic devices and then communicate with the external electronic device based on the announced TWT.

In FIG. 10, it has been described that the specified data transmitted by the electronic device 1001 based on the specified interval is used to prevent data missing occurring in the co-existing communication state through the announced TWT. However, embodiments of the present disclosure are not limited thereto. For example, the specified data transmitted by the electronic device 1001 based on the specified interval may be referred to as data used to prevent problems (e.g., collisions) caused by an external electronic device not detecting a VLP communication operation of the electronic device 1001 through the trigger-enabled option.

Figure 11:
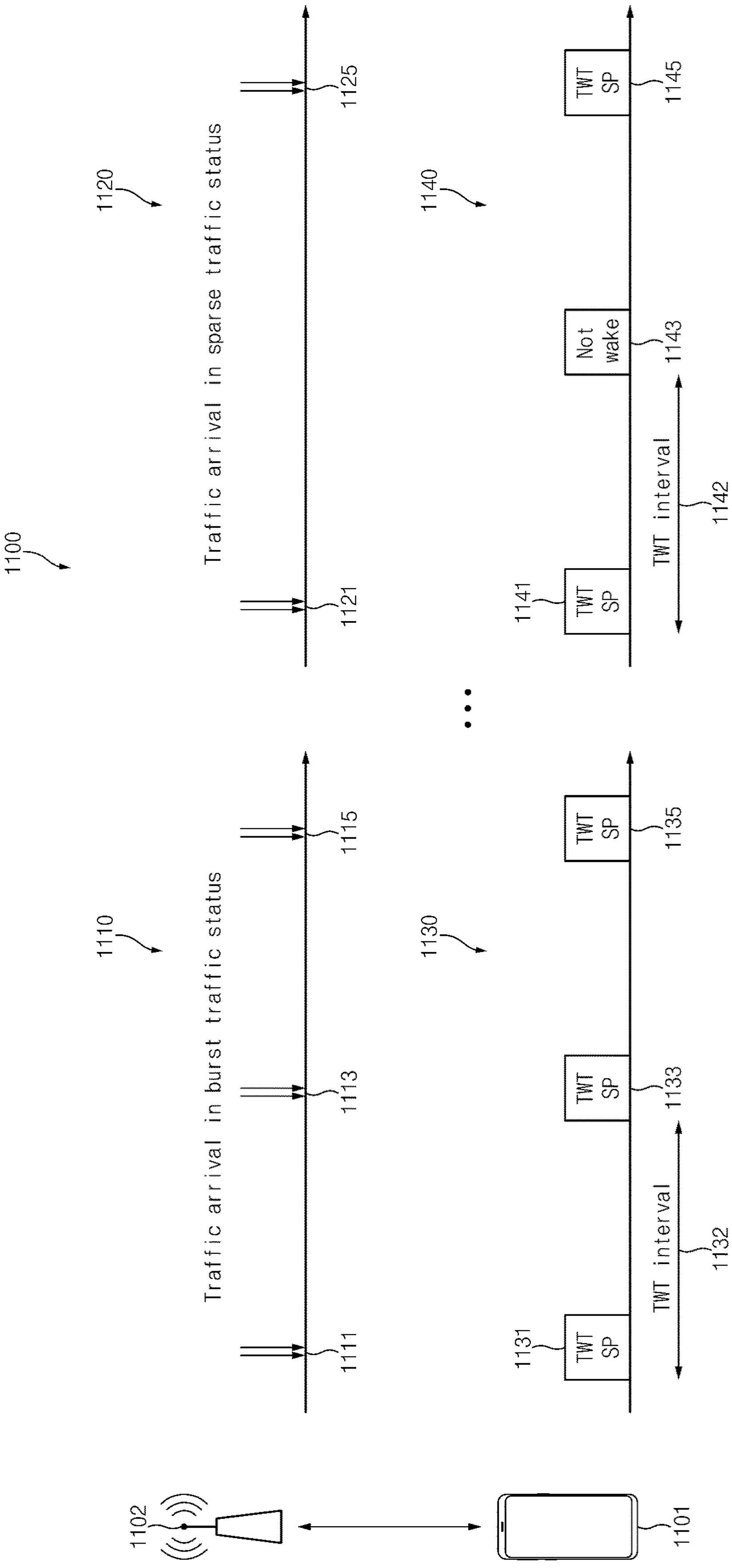
FIG. 11 is an operation diagram illustrating an operation sequence of an electronic device and an external electronic device over time, according to various embodiments.

FIG. 11 is an operation diagram 1100 illustrating an operation sequence of an electronic device 1101 and an external electronic device 1102 over time, according to various embodiments.

As illustrated in FIG. 11, the electronic device 1101 may perform a communication operation with the external electronic device 1102 using the announced TWT. According to an embodiment, the electronic device 1101 may receive data from the external electronic device 1102 at every TWT interval determined by TWT negotiation. For example, when performing the TWT negotiation with the external electronic device 1102, the electronic device 1101 may set the TWT interval to a first interval 1132 to perform communication. The electronic device may identify a service type (e.g., first service or second service) being executed, and determine whether to transmit specified data to the external electronic device 1102 every TWT interval according to the service type. According to an embodiment, the electronic device may perform a plurality of TWT negotiations with the external electronic device 1102 based on a plurality of service types (e.g., first service or second service) being executed.

Hereinafter, a communication method by the electronic device 1101 executing the first service is described with reference to reference numerals 1110 and 1130. A communication method by the electronic device 1101 executing the second service is described with reference to reference numerals 1120 and 1140.

According to an embodiment, referring to reference numeral 1110, the electronic device 1101 may execute the first service (e.g., a game service or a video service) to perform communication with the external electronic device 1102. Referring to reference numeral 1130, the electronic device 1101 may be switched to an active state in sections corresponding to reference numerals 1131, 1133, and 1135. The electronic device 1101 may transmit specified data (e.g., the second data of FIG. 9) to the external electronic device 1102 in a section corresponding to the active state. If it is determined that the electronic device 1101 is switched to the active state, the external electronic device 1102 may transmit (e.g., 1111, 1113, and 1115) data in sections corresponding to reference numbers 1131, 1133, and 1135, respectively. For example, if the external electronic device 1102 agrees to use the announced TWT through the TWT negotiation with the electronic device 1101, the external electronic device 1102 may transmit a trigger frame signal to the electronic device 1101 every TWT interval (e.g., TWT interval 1132) and may transmit (e.g., 1111, 1113, and 1115) data only if a response thereto is received.

According to an embodiment, referring to reference numeral 1120, the electronic device 1101 may execute the second service (e.g., a voice over IP (VoIP) service) to perform communication with the external electronic device 1102. Referring to reference numeral 1140, the electronic device 1101 may be switched to the active state in sections corresponding to reference numerals 1141 and 1145, and may not be switched to the active state in a section corresponding to reference numeral 1143. The electronic device 1101 may transmit specified data (e.g., the second data of FIG. 9) to the external electronic device 1102 in sections corresponding to the active state (e.g., sections corresponding to reference numerals 1141 and 1145). The external electronic device 1102 may receive specified data from the electronic device 1101, and may transmit (e.g., 1121 and 1125) data in sections (e.g., sections corresponding to reference numerals 1141 and 1145) in which it is determined that the electronic device is in the active state, respectively.

For example, if the external electronic device 1102 agrees to use the announced TWT for the second service (e.g., voice over IP (VoIP) service) through the TWT negotiation with the electronic device 1101, the external electronic device 1102 may transmit a trigger frame signal to the electronic device 1101 every TWT interval (e.g., the second interval 1142) and may transmit (e.g., 1121 and 1125) data only if a response thereto is received. In other words, the electronic device 1101 may perform the TWT negotiation with the external electronic device 1102 to set the TWT interval to the first interval, identify a service to be executed, and determine whether to transmit a response to the external electronic device 1102 every TWT service period (SP) based on the type of the service. If the electronic device 1101 executes the second service to perform communication with the external electronic device 1102, the electronic device 1101 may not transmit a response to the trigger frame signal received from the external electronic device 1102 in the section corresponding to reference numeral 1143.

In FIG. 11, it has been described that reference numerals 1110 and 1130 indicates the first service (e.g., a game service or a video service) as an example, and reference numerals 1120 and 1140 indicate the second service (e.g., a voice over IP (VoIP) service) as an example. However, reference numerals 1110 to 1140 may also refer to services classified based on the state of one service (e.g., a game service or a video service). For example, reference numeral 1110 and reference numeral 1130, and reference numeral 1120 and reference numbers 1140 may be classified based on traffic conditions that are changed when different functions are provided in one service. That is, the present disclosure is not limited in this regard.

In FIG. 11, the TWT intervals of the reference numerals 1130 and 1140 (e.g., the first interval 1132 or the second interval 1142) are described with reference numerals different from each other, but may be referred to as intervals having the same value.

Figure 12:
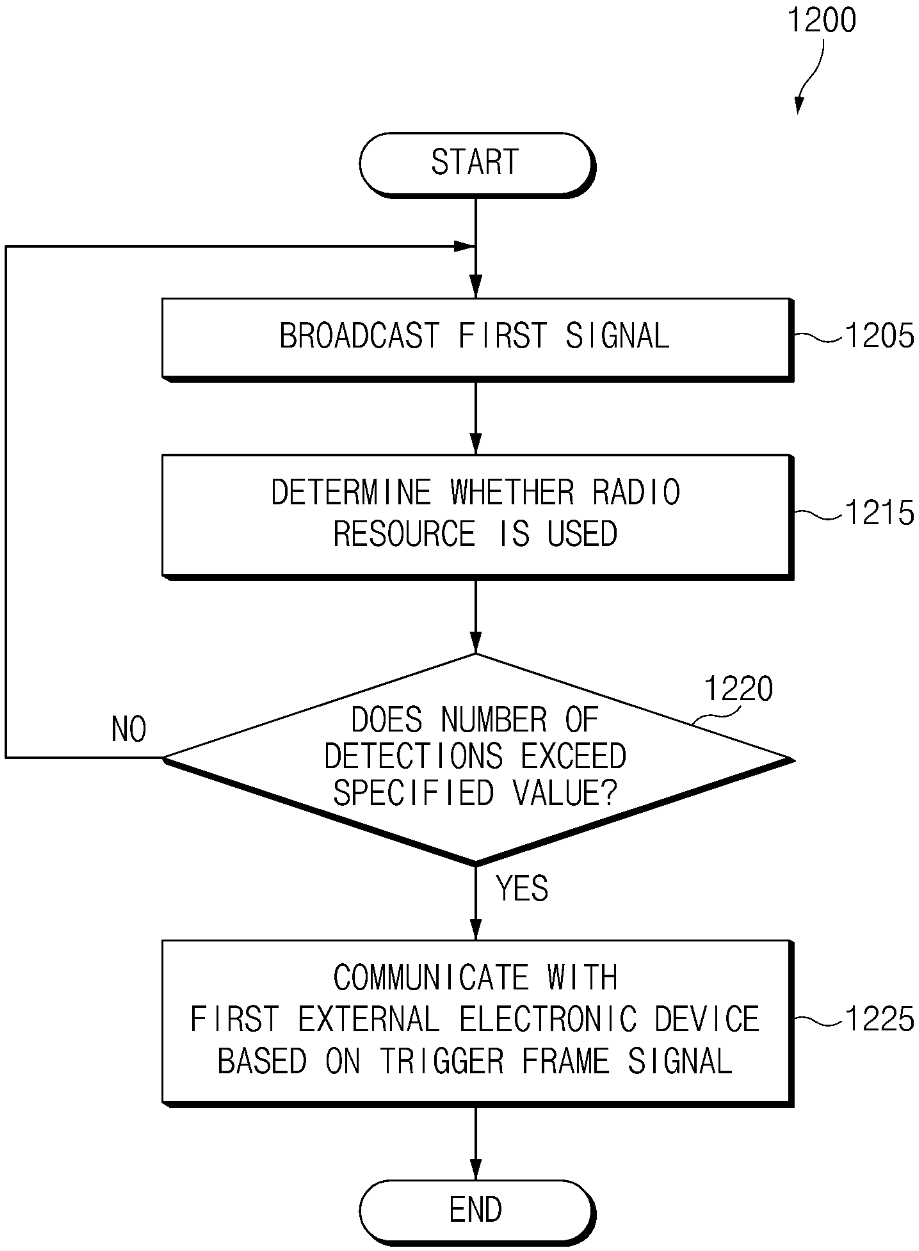
FIG. 12 is a flowchart illustrating operations of an electronic device, according to various embodiments.

FIG. 12 is a flowchart 1200 illustrating operations of an electronic device, according to various embodiments.

In operation 1205, an electronic device (e.g., the electronic device 101 of FIG. 1) may broadcast a first signal. For example, the electronic device may broadcast a first signal including first data based on a specified interval. In an embodiment, the electronic device may broadcast the first signal including the first data, after setting values corresponding to a rate subfield and a length subfield included in the first data to specified values. According to an embodiment, at least one external electronic device that has received the first signal among a plurality of external electronic devices may delay the use (or occupation) of a radio resource (e.g., frequency band) for performing communication between the electronic device and the first external electronic device in response to the first signal. According to an embodiment, a specified interval in which the electronic device broadcasts the first signal may be different from an interval in which the electronic device transitions to a wake-up state through TWT negotiation with the first external electronic device (e.g., TWT interval). For example, the specified interval in which the electronic device broadcasts the first signal may be longer than the TWT interval. According to an embodiment, the electronic device may broadcast the first signal at a point in time different from a TWT interval agreed to perform communication with the first external electronic device. For example, the electronic device may broadcast the first signal at a point in time different from a point in time at which data is transmitted and received to and from the first external electronic device.

In operation 1215, the electronic device may check (or monitor) whether at least one second external electronic device uses a radio resource for performing communication between the electronic device and the first external electronic device based on the broadcast first signal. An operation for an electronic device to determine (or monitor) whether external electronic devices use a radio resource may be referred to as a clear channel assessment (CCA) operation. For example, the electronic device may detect a second external electronic device (e.g., the second external electronic device 403 of FIG. 4) using the radio resource between the electronic device and the first external electronic device (e.g., the first external electronic device 402 of FIG. 4), from among a plurality of external electronic devices. The second external electronic device may be referred to as an electronic device that does not receive the first signal broadcast by the electronic device and performs a communication operation with the first external electronic device using the radio resource.

According to an embodiment, the electronic device may perform, based on a specified interval, the operation 1205 of broadcasting the first signal and the operation 1215 of determining whether the at least one second external electronic device uses a radio resource that may at least partially overlap or cause interference with a radio resource (e.g., frequency band) used by the electronic device and the first external electronic device. For example, the electronic device may perform operations 1205 and 1215 based on the specified interval to detect at least one second external electronic device. In an embodiment, the specified interval may be referred to as an interval predetermined based on a test for communication operation performance of the electronic device and the first external electronic device.

In operation 1220, the electronic device may determine whether the number of detections calculated through a detection operation exceeds a specified value. For example, the electronic device may perform operation 1220 after performing operations 1205 and 1215 for a specified time. If it is determined that the number of detections calculated through the detection operation exceeds the specified value (e.g., YES in operation 1220), the electronic device may perform operation 1225. The electronic device may perform the detection operation based on a specified interval and determine whether the number of detections calculated based on the specified interval exceeds a specified value.

In operation 1220, if it is determined that the number of detections calculated through the detection operation does not exceed the specified value (e.g., NO in operation 1220), the electronic device may continue to perform operation 1205 (or based on the specified interval). According to an embodiment, if the electronic device performs operations 1205 to 1215 after performing the TWT negotiation with the first external electronic device to disable the trigger-enabled option, the electronic device may maintain a state in which the trigger-enabled option is disabled. According to another embodiment, if the electronic device performs operations 1205 to 1215 after performing the TWT negotiation with the first external electronic device to enable the trigger-enabled option, the electronic device may re-perform TWT negotiation to disable the trigger-enabled option.

In operation 1225, the electronic device may perform communication with the first external electronic device based on a trigger frame signal transmitted from the first external electronic device. For example, the electronic device may transmit a second signal including second data to the first external electronic device in response to the trigger frame signal received from the first external electronic device. As another example, the second data may include at least one of a power saving (PS)-poll frame, an unscheduled-automatic power saver delivery (U-APSD) frame, and a null frame. In an embodiment, the communication method in operation 1225 described above may be performed after performing TWT negotiation to allow the electronic device to change a flow type field value included in the TWT setting information. An operation of the electronic device performing wireless communication if it is determined that the number of at least one second external electronic device using a radio resource exceeds a specified value may be referred to as a TWT operation in which a trigger-enabled option is enabled. According to an embodiment, if the electronic device performs operations 1205 to 1215 after performing the TWT negotiation with the first external electronic device to disable the trigger-enabled option, the electronic device may re-perform the TWT negotiation with the first external electronic device to enable the trigger-enabled option.

Figure 13:
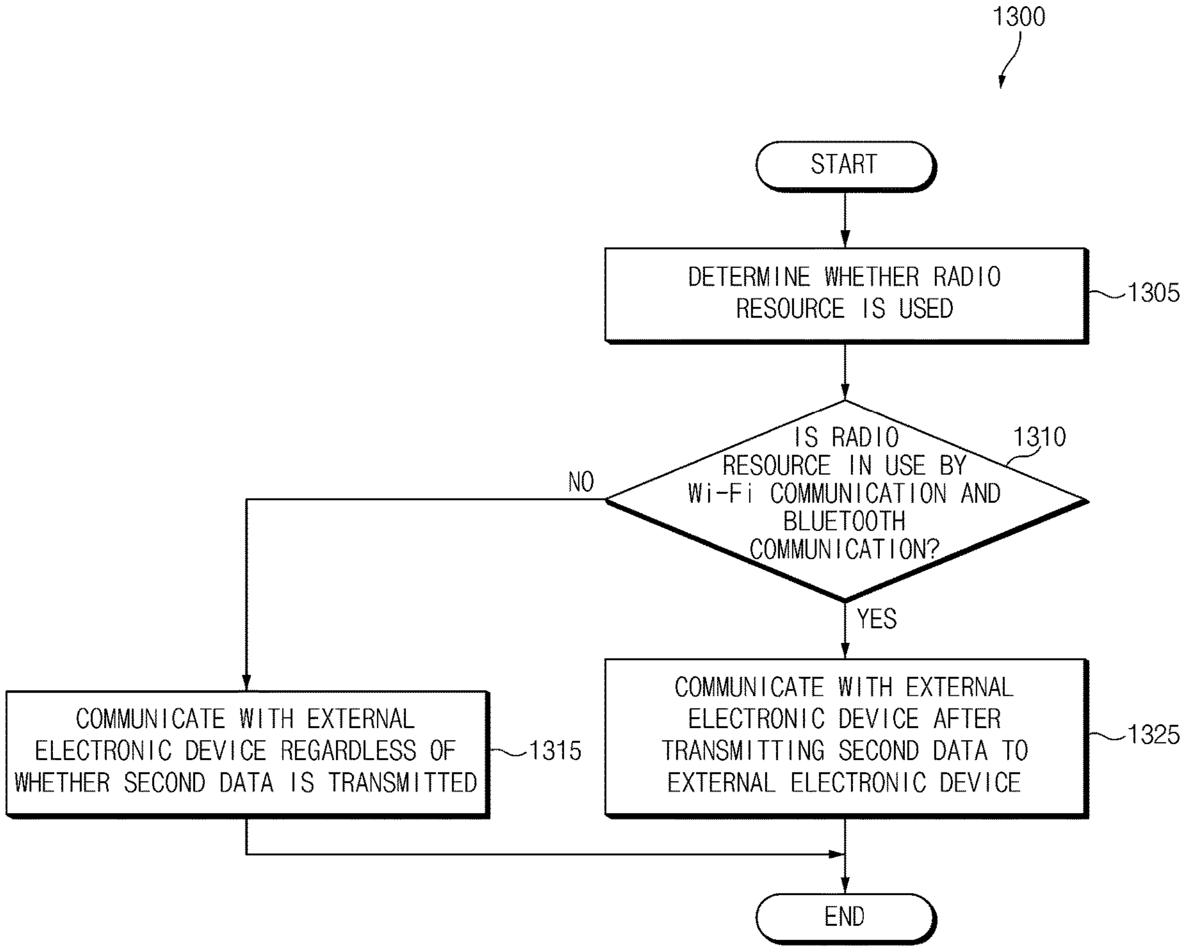
FIG. 13 is a flowchart illustrating operations of an electronic device, according to various embodiments.

FIG. 13 is a flowchart 1300 illustrating operations of an electronic device, according to various embodiments.

In operation 1305, an electronic device (e.g., the electronic device 101 of FIG. 1) may determine whether a radio resource for performing communication with an external electronic device is used (or occupied). For example, the electronic device may determine whether a radio resource for performing communication with the external electronic device is in use by Wi-Fi communication and/or Bluetooth communication between a plurality of electronic devices.

In operation 1310, if it is determined that the radio resource is in use based on Wi-Fi communication and Bluetooth communication between a plurality of electronic devices (e.g., YES in operation 1310), the electronic device may perform operation 1325.

In operation 1310, if it is determined that the radio resource is not in use based on Wi-Fi communication and Bluetooth communication between a plurality of electronic devices (e.g., NO in operation 1310), the electronic device may perform operation 1315. For another example, the electronic device may identify an operation (e.g., operation 1310) of checking whether a radio resource is used based on a specified period.

In operation 1315, the electronic device may perform communication with the external electronic device regardless of whether the second signal including second data is transmitted. In other words, in operation 1315, the electronic device performing the communication operation may perform the communication operation based on the unannounced TWT by performing TWT negotiation to change the trigger subfield value included in the TWT setting information.

In operation 1325, the electronic device may perform communication with the external electronic device after transmitting the second signal including second data to the external electronic device. In other words, in operation 1325, the electronic device performing the communication operation may perform the communication operation based on the announced TWT by performing the TWT negotiation to change the trigger subfield value in the TWT setting information.

Figure 14:
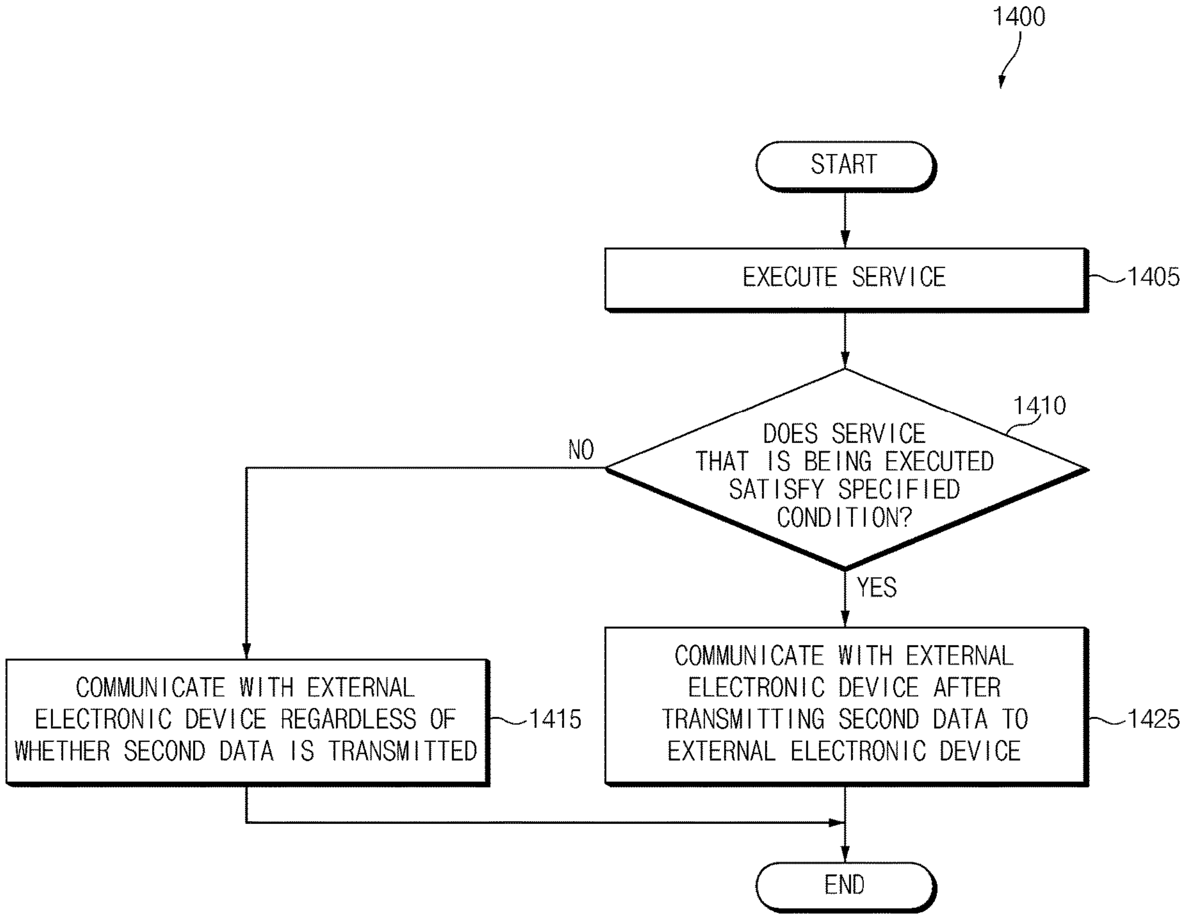
FIG. 14 is a flowchart illustrating operations of an electronic device, according to various embodiments.

FIG. 14 is a flowchart 1400 illustrating operations of an electronic device, according to various embodiments.

In operation 1405, an electronic device (e.g., the electronic device 101 of FIG. 1) may execute a service. For example, the electronic device may provide various services based on an external input (e.g., a user touch input) or a specified interval. A description of various services provided by the electronic device may refer to FIG. 9.

In operation 1410, the electronic device may determine whether the service that is being executed satisfies a specified condition. For example, the electronic device may determine whether the service that is being executed is being executed based on irregular traffic intervals. For another example, the electronic device may determine whether the amount of traffic calculated during execution of the service exceeds a specified amount of traffic.

In operation 1410, if it is determined that the service that is being executed satisfies the specified condition (e.g., YES in operation 1410), the electronic device may perform operation 1425. For example, the electronic device may perform operation 1425 if the service that is being executed is executed based on irregular traffic intervals or if the amount of traffic calculated during execution of the service exceeds the specified amount of traffic.

In operation 1410, if it is determined that the service that is being executed does not satisfy the specified condition (e.g., NO in operation 1410), the electronic device may perform operation 1415.

In operation 1415, the electronic device may perform communication with the external electronic device regardless of whether the second signal including second data is transmitted. In other words, in operation 1315, the electronic device performing the communication operation may perform the communication operation based on the unannounced TWT by performing TWT negotiation to change the trigger subfield value included in the TWT setting information.

In operation 1425, the electronic device may perform communication with the external electronic device after transmitting the second signal including second data to the external electronic device. In other words, in operation 1425, the electronic device performing the communication operation may perform the communication operation based on the announced TWT by performing the TWT negotiation to change the trigger subfield value in the TWT setting information.

For example, the operations of the electronic device described with reference to FIGS. 12, 13, and 14 may be performed by the electronic device 101 shown in FIG. 1. Alternatively or additionally, the operations of the electronic device described with reference to FIGS. 12, 13, and 14 may be implemented by instructions capable of being performed (or executed) by a processor (e.g., the processor 120 of FIG. 1) included in the electronic device 101.

While the present disclosure has been particularly shown and described with reference to embodiments thereof, it will be understood that various changes in form and details may be made therein without departing from the spirit and scope of the following claims.

What is claimed is:

1. An electronic device comprising:

wireless communication circuitry configured to perform Wi-Fi communication with a first external electronic device of a plurality of external electronic devices;

memory storing at least one instruction; and at least one processor operatively coupled to the wireless communication circuitry and the memory, wherein the at least one instruction, when executed by the at least one processor individually or collectively, causes the electronic device to:

broadcast, using the wireless communication circuitry and based on a time interval, a first signal comprising first data that comprises time information;

detect, during a time span corresponding to the time information, at least one second external electronic device from among the plurality of external electronic devices that uses a radio resource for communication with at least one of the electronic device and the first external electronic device, wherein the time span occurs after the broadcasting of the first signal;

identify a number of detections of the at least one second external electronic device, during the time span;

based on the number of detections exceeding a threshold value, perform, using the wireless communication circuitry, communication with the first external electronic device based on a trigger frame signal received from the first external electronic device; and based on the number of detections being equal to or less than the threshold value, perform, using the wireless communication circuitry, communication with the first external electronic device based on the time information without using the trigger frame signal.

2. The electronic device of claim 1, wherein the at least one instruction, when executed by the at least one processor individually or collectively, causes the electronic device to:

broadcast the first signal comprising the first data, after setting values corresponding to a rate subfield and a length subfield in the first data to specified values.

3. The electronic device of claim 2, wherein the at least one instruction, when executed by the at least one processor individually or collectively, causes the electronic device to:

determine a delay time for delaying use of the radio resource for communication used by the at least one second external electronic device, based on a predetermined value corresponding to the rate subfield and another predetermined value corresponding to the length subfield; and determine, based on the delay time, whether the at least one second external electronic device is using the radio resource for communication with the at least one of the electronic device and the first external electronic device.

4. The electronic device of claim 1, wherein the at least one instruction, when executed by the at least one processor individually or collectively, causes the electronic device to:

based the trigger frame signal being received from the first external electronic device, transmit, to the first external electronic device, a second signal comprising second data.

5. The electronic device of claim 4, wherein the second data comprises at least one of a power saving (PS)-poll frame, an unscheduled-automatic power saver delivery (U-APSD) frame, and a null frame.

6. The electronic device of claim 1, wherein the memory further stores target wake time (TWT) setting information associated with the performing of the communication with the first external electronic device, and wherein the TWT setting information comprises at least one of a TWT identifier (ID), a service type allocated to the TWT, a service period of the TWT, and a TWT interval.

7. The electronic device of claim 6, wherein the at least one instruction, when executed by the at least one processor individually or collectively, causes the electronic device to:

perform a TWT negotiation with the first external electronic device, wherein a flow type field value of the TWT setting information is changed from a first flow type to a second flow type; and perform the communication with the first external electronic device using the second flow type.

8. A method for performing wireless communication by an electronic device, the method comprising:

broadcasting, based on a time interval, a first signal comprising first data that comprises time information;

detecting, during a time span corresponding to the time information, at least one second external electronic device from among a plurality of external electronic devices that uses a radio resource for communication with at least one of the electronic device and a first external electronic device of the plurality of external electronic devices, wherein the time span occurs after the broadcasting of the first signal;

identifying a number of detections of the at least one second external electronic device, during the time span;

based on the number of detections exceeding a threshold value, performing communication with the first external electronic device based on a trigger frame signal received from the first external electronic device; and based on the number of detections being equal to or less than the threshold value, performing communication with the first external electronic device based on the time information without using the trigger frame signal.

9. The method of claim 8, wherein the broadcasting of the first signal comprises:

broadcasting the first signal comprising the first data, after setting values corresponding to a rate subfield and a length subfield in the first data to specified values.

10. The method of claim 9, further comprising:

determining a delay time for delaying use of the radio resource for communication used by the at least one second external electronic device, based on a predetermined value corresponding to the rate subfield and the another predetermined value corresponding to the length subfield; and determining, based on the delay time, whether the at least one second external electronic device is using the radio resource for communication with the at least one of the electronic device and the first external electronic device.

11. The method of claim 8, further comprising:

based on the trigger frame signal being received from the first external electronic device, transmitting, to the first external electronic device, a second signal comprising second data.

12. The method of claim 8, further comprising:

performing a target wake time (TWT) negotiation with the first external electronic device, wherein at least one of a flow type field value and a trigger subfield value of the TWT setting information is changed from a first value to a second value.

13. The method of claim 12, further comprising:

setting a target wake time (TWT) interval to a first interval based on the performing of the TWT negotiation with the first external electronic device;

based on the first interval elapsing, transitioning from a sleep state to a wake-up state when a first service is executed to communicate with the first external electronic device; and transmitting, to the first external electronic device, the first signal comprising the first data, after the transitioning to the wake-up state.

* * * * *